United States Patent
Yamamoto et al.

(10) Patent No.: US 8,752,446 B2
(45) Date of Patent: Jun. 17, 2014

(54) BALL SCREW DEVICE

(75) Inventors: Kazuhito Yamamoto, Maebashi (JP); Junji Minakuchi, Maebashi (JP); Yutaka Nagai, Maebashi (JP); Masahiro Nobutomo, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/058,124

(22) PCT Filed: Aug. 25, 2010

(86) PCT No.: PCT/JP2010/005236
§ 371 (c)(1),
(2), (4) Date: Feb. 8, 2011

(87) PCT Pub. No.: WO2011/024450
PCT Pub. Date: Mar. 3, 2011

(65) Prior Publication Data
US 2012/0144944 A1    Jun. 14, 2012

(30) Foreign Application Priority Data

Aug. 31, 2009 (JP) .................... 2009-200082
Oct. 28, 2009 (JP) .................... 2009-248090
Apr. 9, 2010 (JP) .................... 2010-090389

(51) Int. Cl.
*F16H 1/20* (2006.01)
*F16H 1/24* (2006.01)
*F16H 55/02* (2006.01)

(52) U.S. Cl.
USPC ............................. 74/424.72; 74/424.82

(58) Field of Classification Search
CPC ............ F16H 25/2214; F16H 25/2204; F16H 25/2242

USPC ......... 74/424.82, 424.83, 424.72, 89.27, 89.3
See application file for complete search history.

(56) References Cited

U.S. PATENT DOCUMENTS 3,068,713 A  * 12/1962 Davis .................... 74/424.82
5,582,072 A    12/1996 Yamaguchi et al.
(Continued)

FOREIGN PATENT DOCUMENTS

| CN | 1377755 A | 11/2002 |
| CN | 1597246 A | 3/2005 |

(Continued)

OTHER PUBLICATIONS

International Preliminary Report on Patentability dated Mar. 22, 2012 (seven (7) pages).

(Continued)

Primary Examiner — Justin Krause
(74) Attorney, Agent, or Firm — Crowell & Moring LLP

(57) ABSTRACT

A ball screw apparatus is provided which is less likely to increase dynamic friction torque even when a nut is contracted by cooling, and in which cooling effect is made as high as possible and which does not invite excessive machining efficiency droop and increase in pressure loss. The ball screw apparatus includes a screw shaft, a nut screwed with the screw shaft via a plurality of balls, and a cooling section cooling the nut. The plurality of balls to which preload is applied in a two-point contact state, with a preload direction as a tensile direction, are disposed between a screw groove of the screw shaft and a screw groove of the nut. Or, a ratio of the axial length L of the through hole axially formed in the nut and the diameter D of the through hole axially formed in the nut is given by an equation "$10 \leq L/D \leq 60$".

2 Claims, 18 Drawing Sheets

(56) References Cited

U.S. PATENT DOCUMENTS

| | | | |
|---|---|---|---|
| 6,792,822 B2 * | 9/2004 | Ninomiya | 74/424.82 |
| 6,925,900 B2 | 8/2005 | Ohkubo | |
| 7,363,835 B2 * | 4/2008 | Ohkubo et al. | 74/424.86 |
| 2003/0089187 A1 | 5/2003 | Liao | |
| 2007/0137347 A1 | 6/2007 | Teramachi et al. | |

FOREIGN PATENT DOCUMENTS

| | | |
|---|---|---|
| CN | 1871460 A | 11/2006 |
| JP | 52-63557 A | 5/1977 |
| JP | 58-69182 U | 5/1983 |
| JP | 6-235446 A | 8/1994 |
| JP | 11-287306 A | 10/1999 |
| JP | 2000-24876 A | 1/2000 |
| JP | 2002-310258 A | 10/2002 |
| JP | 2002-372119 A | 12/2002 |
| JP | 2003-172427 A | 6/2003 |
| JP | 2005-30521 A | 2/2005 |
| JP | 2007-51688 A | 3/2007 |
| JP | 2010-133556 A | 6/2010 |

OTHER PUBLICATIONS

Japanese-language International Search Report dated Sep. 28, 2010 (three (3) pages).

Junji Chigira, "Heat Transfer Calculation Method", $2^{nd}$ edition, published by Kogakutosho Inc, 1981 (including English translation (17 pages total)).

International Search Report dated Sep. 28, 2010 with English translation (four (4) pages).

Chinese Office Action dated Feb. 1, 2013 including English-language translation (Fourteen (14) pages).

Japanese Office Action dated Mar. 12, 2013 w/ English translation (four (4) pages).

Japanese Office Action dated Oct. 15, 2013 (2 pages).

Japanese Office Action dated Nov. 12, 2013 (2 pages).

Chinese Office Action dated Sep. 11, 2013 (four (4) pages).

* cited by examiner

FIG. 2
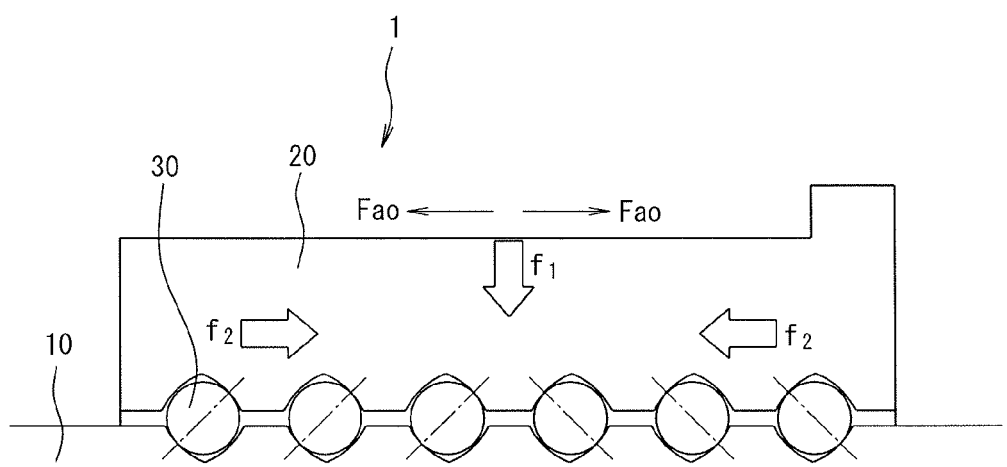
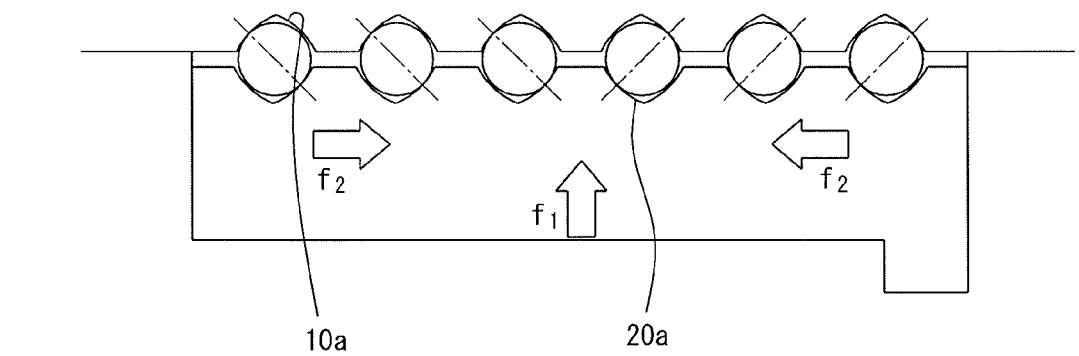

*FIG. 7*
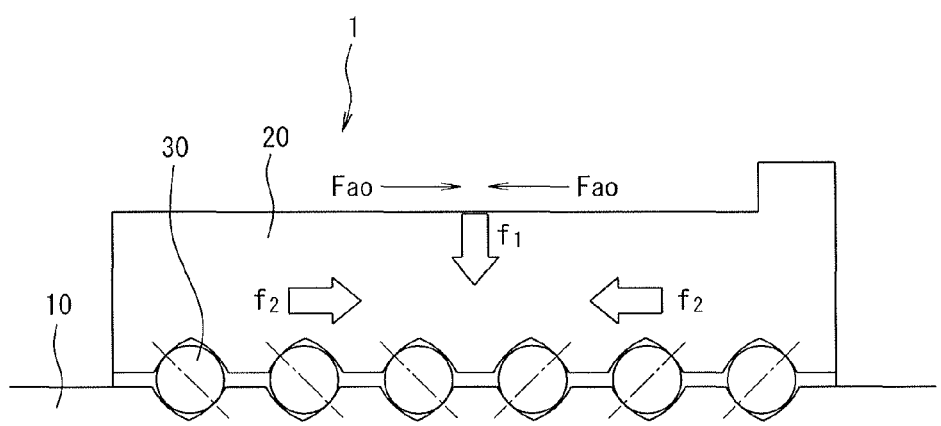
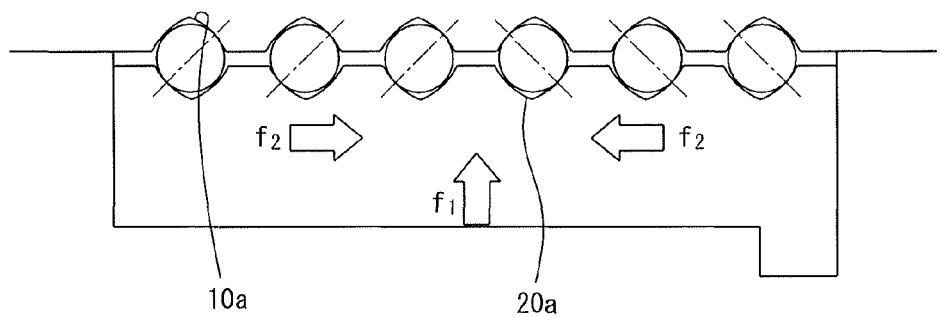

FIG. 8
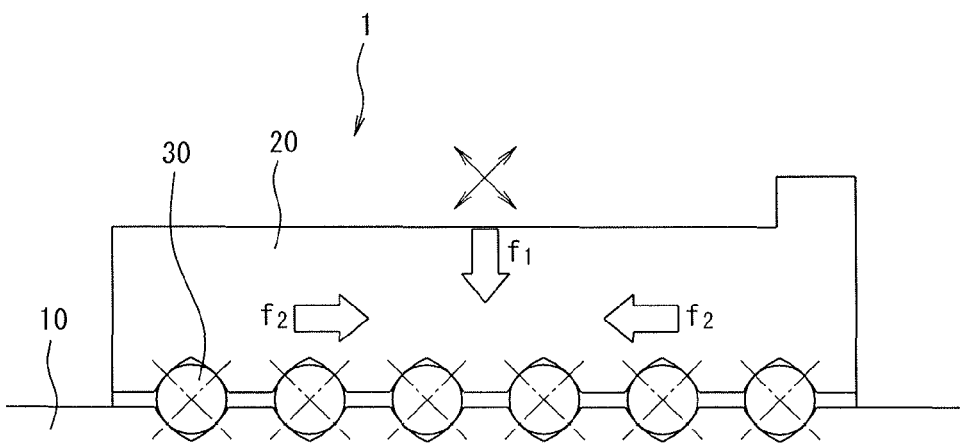
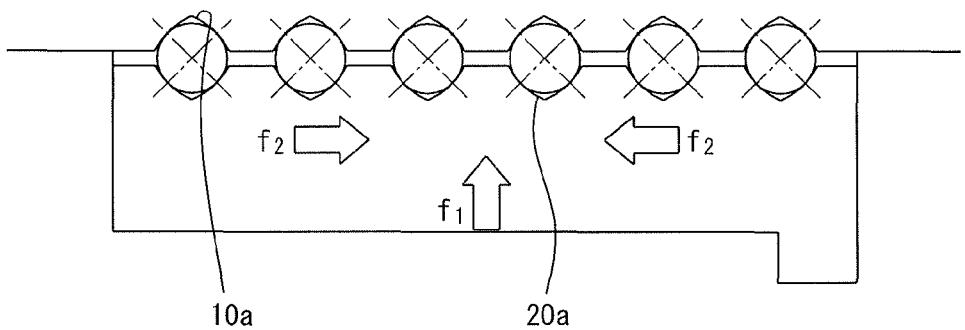

BALL SCREW DEVICE

BACKGROUND OF THE INVENTION

1. Field of the Invention

The present invention relates to a ball screw apparatus, in particular to a ball screw apparatus in which a nut is coolable.

2. Related Art

Conventionally, in a screw apparatus including a screw shaft and a feed nut which is screwed with the screw shaft and relatively rotatable, point contact or surface contact occurs during revolutions. On this account, a cooling section is provided at a heat source (e.g., the feed nut).

As an example of the screw apparatus of this kind, there has been disclosed a screw apparatus where a cooling pipe through which coolant circulates is arranged in the feed nut as the cooling section (heat exchanger) (see e.g., Patent Document 1).

Further, as technology of cooling the feed nut, there is the invention disclosed in Patent Document 2. Specifically, this technology flows coolant in a coolant through hole (hereafter, simply referred to as a through hole) to cool down the feed nut.

PRIOR ART DOCUMENT

Patent Document

Patent Document 1: Laid-open Patent publication No. 52-63557 A

Patent Document 2: Laid-open Patent publication No. 2002-310258 A

Non-Patent Document

Non-Patent Document 1: "Heat Transfer Calculation Method", $2^{nd}$ edition, written by Junji CHIGIRA, published by KOGAKUTOSHO, Inc, pp. 18-97, 1981.

SUMMARY OF THE INVENTION

Problem to be Solved

The screw apparatus disclosed in Patent Document 1, however, produces heat contraction in the feed nut cooled by the heat exchanger, resulting in an increase in torque.

Specifically speaking, a value of temperature rise $\theta$ of the screw apparatus is expressed by the following equation (1), where t is an elapsed time; CM is heat capacity of the screw apparatus; $\beta$ is unit time from the screw apparatus, discharge heat quantity per difference in unit time; and Q is heat quantity produced from the nut per unit time.

$$\theta = \frac{Q}{B}\left\{1 - \exp\left(-\frac{\beta}{CM} \cdot t\right)\right\} \quad \text{equation (1)}$$

Q in the equation (1) is expressed by the following equation (2). In equation (2), n is kinetic friction torque and n is number of shaft revolutions.

$$Q = T \times 60n \times 2\pi/1000 = 0.12\pi nT \quad \text{equation (2)}$$

As is disclosed in Patent Document 1, simply cooling the feed nut eventuates in increase of $\beta$ in equation (1). Simultaneous increase in the torque as aforesaid leads to increase of Q according to equation (2), with the result that a value of the temperature rise found by Q/$\beta$ increases. Accordingly, simply cooling the feed nut invokes conversely a problem of the total cooling efficiency degradation.

FIGS. 7 and 8 are a schematic diagram showing a relationship between a preload direction in every preload type and a heat compression direction of the nut. FIG. 7 is a diagram showing a preload type of two-point contact state in which the preload direction is taken as a compression direction. FIG. 8 is a diagram showing a preload condition of oversize ball.

As shown in FIGS. 7 and 8, the ball screw apparatus 1 includes a screw shaft 10 and a nut 20 screwed with the screw shaft 10 via a plurality of rolling elements 30. The rolling elements 30 are preloaded between a screw groove 10a of the screw shaft 10 and a screw groove 20a of the nut 20.

When heat contraction f going toward a central direction caused by cooling the nut 20, the nut 20 contacts in a direction of increasing preload $F_{a0}$, inducing an increase if dynamic friction torque in the preload condition shown in FIGS. 7 and 8.

On the other hand, the inventors of the present invention estimated that when the nut of the ball screw apparatus is cooled, cooling effect will significantly change depending on the diameter of the through hole through which coolant flows according to the Nusselt method disclosed in Non-Patent Document 1, and they ultimately verified the change in the cooling effect by way of an experiment.

The results obtained experimentally show that the narrower the diameter of the through hole, the more improve thermal conductivity, resulting in increase in the cooling effect as far as a type of the coolant and flow rate are the same.

Nevertheless, indiscreetly narrowing the diameter of the through hole for the purpose of attaining high cooling effect may cause the following two problems of:

(1) suffering from decrease in machining efficiency, leading to higher cost up of the ball screw apparatus because machining is performed to a small and long through hole; and (2) undergoing Large pressure loss when the coolant flows therethrough.

The present invention has made putting a focus on the abovementioned problems and an object thereof is to provide a ball screw apparatus in which cooling is performed by flowing coolant in a through hole axially formed in the nut, wherein high cooling effect of the nut is attained as much as possible.

Solution to the Problem

In order to solve the aforementioned problem, the inventors of the present invention were found, as a result of repeated extensive studies to this end, that adopting a preload type which scarcely increases the total preload makes less likely to increase dynamic friction torque even when the nut is contracted by cooling.

Additionally, the inventors of the present invention fund that in a ball screw apparatus in which cooling is performed by flowing coolant in the through hole axially formed in the nut, defining a ratio of L/D between the length L of the through hole in an axial direction and the diameter D of the through hole makes the cooling effect high as much as possible and does not invoke excessive machining efficiency degradation nor increase in pressure loss.

The present invention is grounded on the knowledge of the inventions of the resent invention and the ball screw apparatus of one embodiment according to the present invention to solve the above problems includes a screw shaft and a nut screwed with the screw shaft via a plurality of rolling elements, and a cooling section cooling the nut, wherein the plurality of rolling elements to which preload is applied in a two-point contact state, with a preload direction as a tensile direction, are disposed between a screw groove of the screw shaft and a screw groove of the nut.

A ball screw apparatus of another embodiment according to the present invention includes a screw shaft and a nut screwed with the screw shaft via a plurality of balls, and a cooling section cooling the nut, by flowing coolant in a through hole axially formed in the nut, wherein a ratio (L/D) of the 1 axial length L of the through hole and the diameter D of the through hole is given by an equation (A):

$$10 \leq L/D \leq 60 \qquad \text{equation (A)}$$

A ball screw apparatus of another embodiment according to the present invention includes a screw shaft and a nut screwed with the screw shaft via a plurality of balls, and a cooling section cooling the nut, wherein the plurality of rolling elements to which preload in an opposite direction to a contraction direction of the nut is applied, produced when the nut is cooled, are disposed between a screw groove of the screw shaft and a screw groove of the nut.

A ball screw apparatus of another embodiment according to the present invention includes a screw shaft and a nut screwed with the screw shaft via a plurality of rolling elements, and a cooling section cooling the nut, wherein the nut is a double nut where two nuts are connected via a spacer; a through hole through which coolant flows from the cooling section is formed in the two nuts and the spacer; an O-ring is provided at both openings of the through hole for coolant of the spacer so as to encircle the through hole; and the plurality of rolling elements to which preload in an opposite direction to a contraction direction of the nut is applied, produced when the nut is cooled, are disposed between a screw groove of the screw shaft and a screw groove of the nut.

Advantageous Effect of the Invention

According to the respective embodiments of the present invention, the invention is capable of providing the ball screw apparatus where cooling effect of the nut is made high as much as possible.

Further, according to the ball screw apparatus of an embodiment of the present invention, the nut is provided with the cooling section as well as a preload type of the nut is two-point contact preload in a tensile direction. Since whereas radial contraction acts in a direction of increasing the preload, axial contraction acts in a direction of decreasing the preload to the contrary, the total preload is hardly increased. Thus, even when the nut is contacted by cooling, the invention can provide the ball screw apparatus of which dynamic friction torque is less likely to increase. That is, the invention is able to prevent temperature rise in the ball screw apparatus invoked along with an increase in the dynamic friction torque. Consequently, the present invention allows offering the ball screw apparatus in which the cooling effect of the nut is made high as much as one can.

According to the ball screw apparatus of another embodiment of the present invention, defining in the above equation (A) a ratio (L/D) between the axial length L of the through hole and the diameter D of the through hole provides an ideal ball screw apparatus cope with both the cooling effect and the total cost efficiency, taking into account of heat transfer coefficient, a difference in temperature between the screw shaft and the coolant, and an area of surfaces contacting with the coolant in the screw shaft.

Further, according to the ball screw apparatus of still another embodiment of the present invention, an increase in preload torque is prevented when cooling the nut.

Furthermore, according to the ball screw apparatus of yet another embodiment of the present invention, the leakage of the coolant from a gap between the nut and the spacer is provided.

BRIEF DESCRIPTION OF THE DRAWINGS

FIG. 2 shows a relationship between a preload condition and contraction in a two-point contact state in which a tensile direction of the ball screw according to the first embodiment is taken as a preload direction;

FIG. 7 shows a relationship between a preload state and contraction in a two-point contact state in which the preload direction is taken as a compression direction;

FIG. 8 shows a relationship between an oversize ball preload state and contraction;

FIG. 15 is a sectional view showing the ball screw apparatus according to a fifth embodiment, in which

DESCRIPTION OF EMBODIMENTS

First Embodiment

Figure 1:
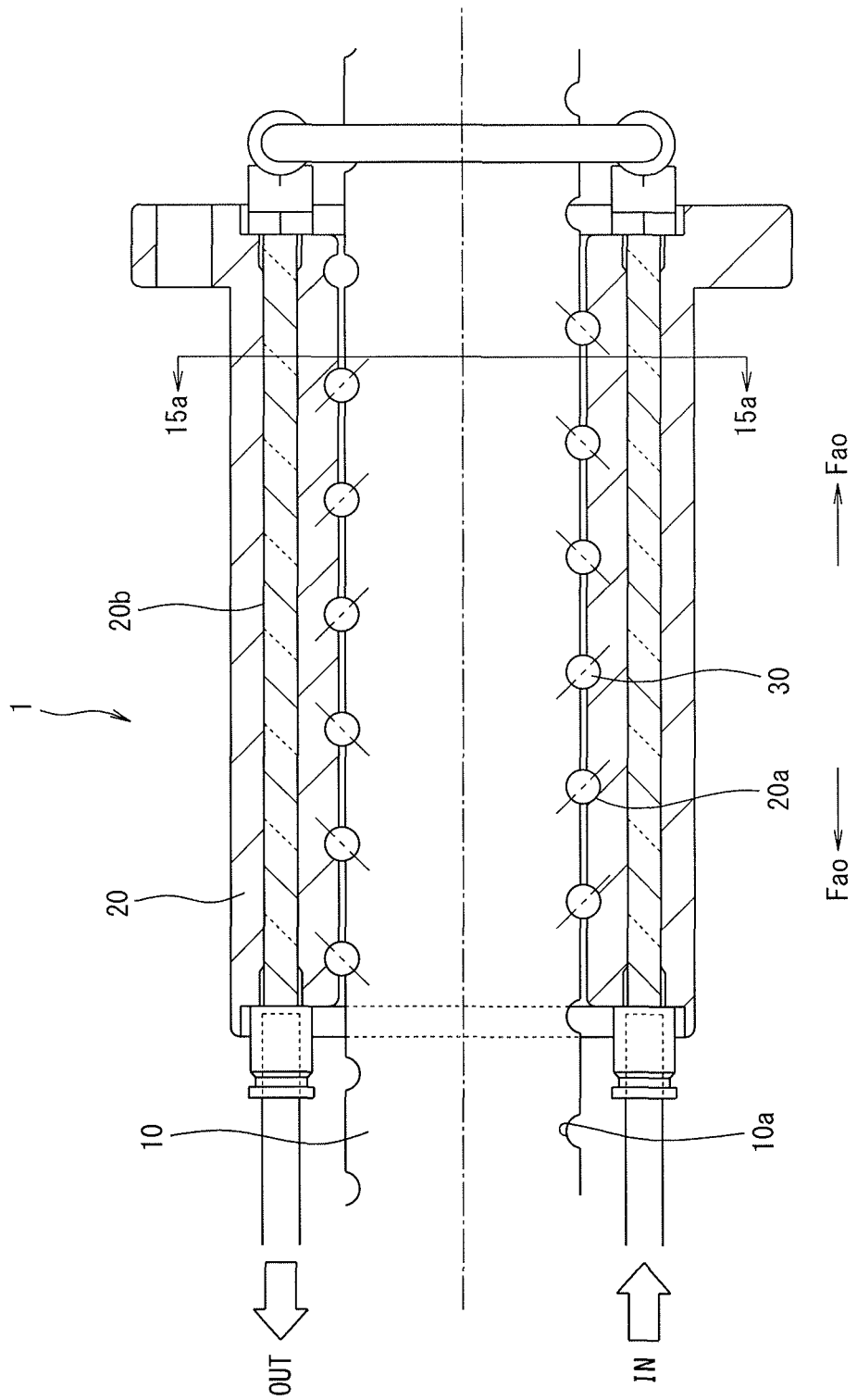
FIG. 1 is a sectional view, along an axial direction, showing a structure of the ball screw apparatus according to a first embodiment.

Hereinafter, a description will be made to a first embodiment of the ball screw apparatus according to the present invention with reference to the accompanying drawings. FIG. 1 is a sectional view in an axial direction showing a structure of the ball screw apparatus according to the present invention.

As shown in FIG. 1, the ball screw apparatus 1 according to the present invention embodiment includes a screw shaft 10 and a nut 20. The screw shaft 10 and the nut 20 are screwed with each other via a plurality of rolling members 30. The nut 20 is formed cylindrically to have an internal diameter larger than an external diameter of the screw shaft 10. A screw groove 20a is formed on an inner peripheral surface of the nut so as to face a screw groove 10a spirally formed on an outer peripheral surface of the screw shaft 10. Hereupon, the rolling members 30 are rollable in a rolling path formed by the screw groove 10a and the screw groove 20a.

Moreover, an axially penetrating through hole 20b is formed in the nut 20. This through hole 20b is used for a path for coolant and to which a circulator (not shown) circulating the coolant in the through hole 29b is connected. The circulator and the through hole 20b constitute a cooling section 40. In this way, circulating the coolant through the through hole 20b by the circulator (not shown) cools down the nut 20.

The plurality of rolling elements (e.g., balls) 30 to which offset lead preload (two-contact preload) preloaded with preload $F_{a0}$ is applied, with the preload direction as a tensile direction are disposed between the screw groove 10a of the screw shaft 10 and the screw groove 20a of the nut 20.

FIG. 2 is a view showing a relationship between a preload condition and contraction of a two-point contact state with the tensile direction as the preload direction.

As shown in FIG. 2, when the tow-contact point preload in the tensile direction is applied to the nut 20, radial heat contraction $f_1$ acts in a direction of increasing preload $F_{a0}$, while axial heat contraction $f_2$ acts in a direction of decreasing it to the contrary. Thus, the total preload is hardly increased.

Because of this, in the ball screw apparatus 1 according to the present embodiment, the application of the two-point contact preload in the tensile direction to the nut 20 enables effective cooling of the overall ball screw apparatus 1 without increasing preload torque even though the nut 20 is cooled.

Namely, the rolling elements 30 to which the preload in an opposite direction to a contraction direction of the nut 20 produced when the nut 20 is cooled are disposed between the screw groove 10a of the screw shaft 10 and the screw groove 20a of the nut 20.

Second Embodiment

Figure 3:
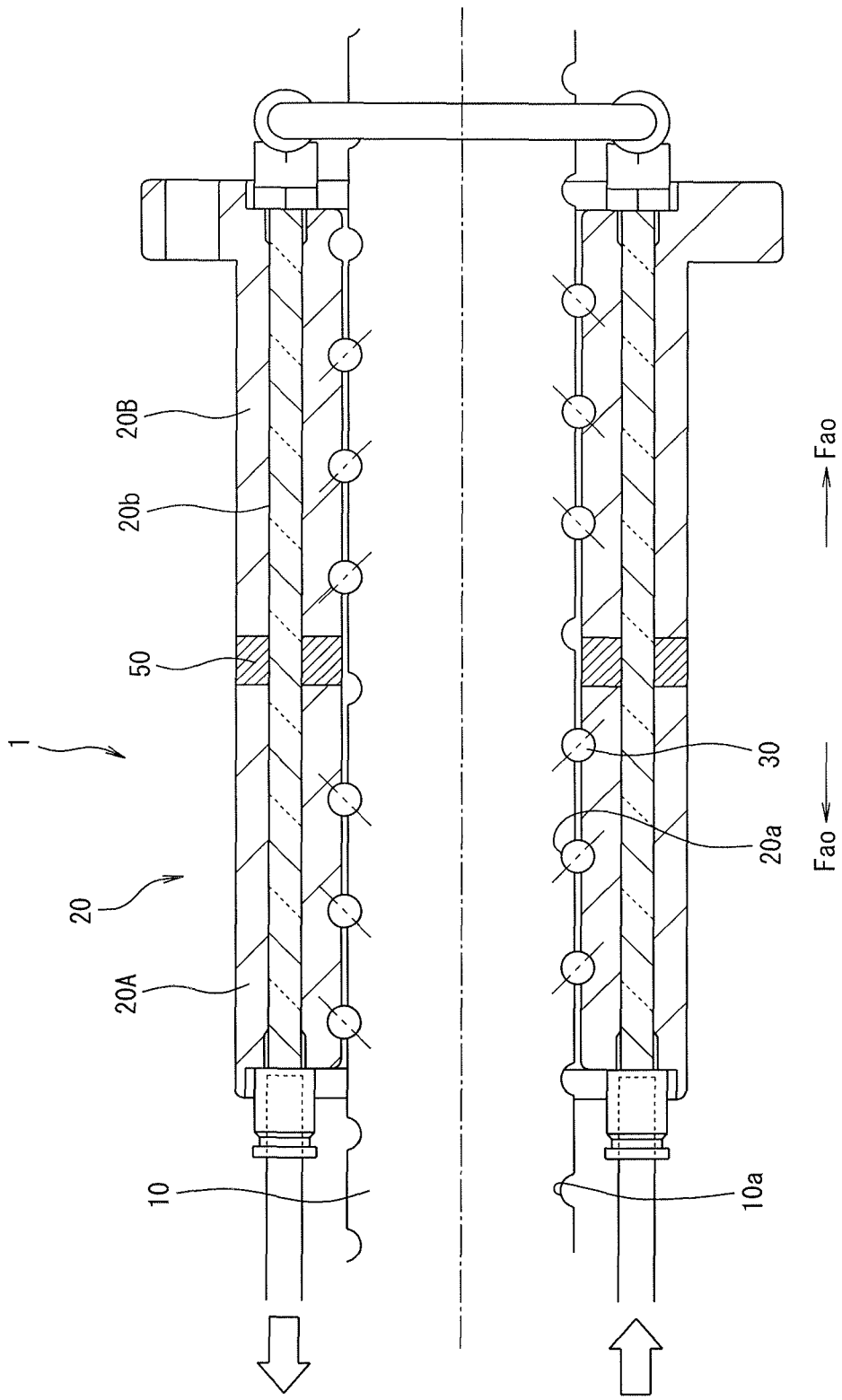
FIG. 3 is a sectional view, along an axial direction, showing a structure of a ball screw apparatus according to a second embodiment.

FIG. 3 is a drawing showing the ball screw apparatus according to the second embodiment. As shown in FIG. 3, whereas the first embodiment adopted the offset lead preload, as a preload style, the second embodiment adopts a double nut preload style in contradistinction thereto.

Specifically, as shown in FIG. 3, the ball screw apparatus 1 according to the second embodiment includes a first nut 20A, and a second nut 20B screwed with a common screw shaft 10 via the plurality of rolling elements 20, and a spacer 50. The spacer 50 is annularly formed to have the substantially same internal diameter as that of the first nut 20A and the second nut 20B, and prevents relative revolutions of the first nut 20A and the second nut 20B. Also, the provision of the spacer 50 applies the preload in the two-contact state preloaded with the preload $F_{a0}$ to the plurality of rolling elements 30 disposed between the respective screw grooves 21a and 22a of the first nut 20A and second nut 20B, and the screw groove 10a of the ball screw 10. Saying in addition, the preload direction is the tensile direction as with the first embodiment.

EXAMPLES

Hereafter, a description will then be made to an example of the ball screw apparatus according the embodiments.

Figure 4:
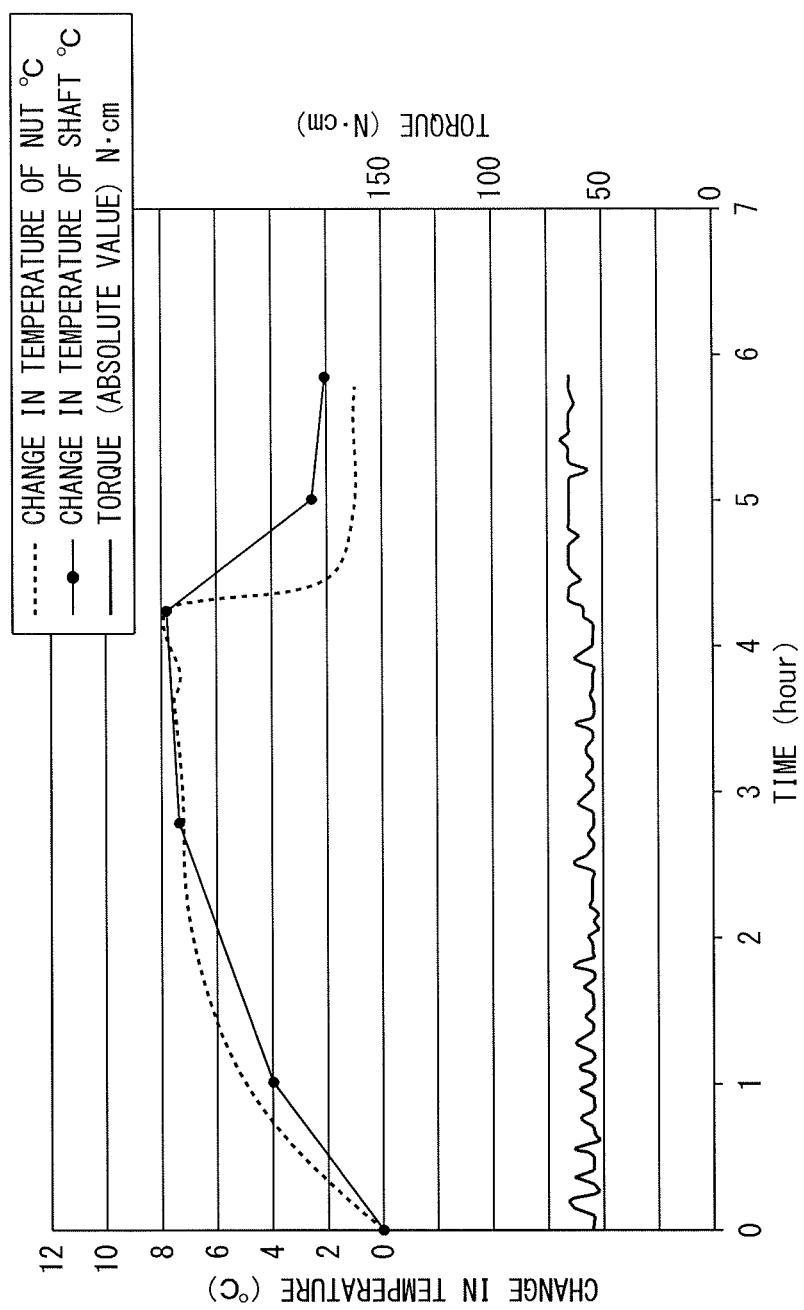
FIG. 4 is a graph showing a result of simultaneous measurement of a value of temperature rise and torque of the nut when the ball screw apparatus according to the first embodiment is activated and the nut is cooled.

FIG. 4 is a graph showing a result obtained by driving the ball screw apparatus) see FIG. 1) of the first embodiment as a ball screw apparatus of the example 1, and by simultaneously measuring a value of temperature rise and torque of the nut when the nut is cooled in the course of driving.

Figure 5:
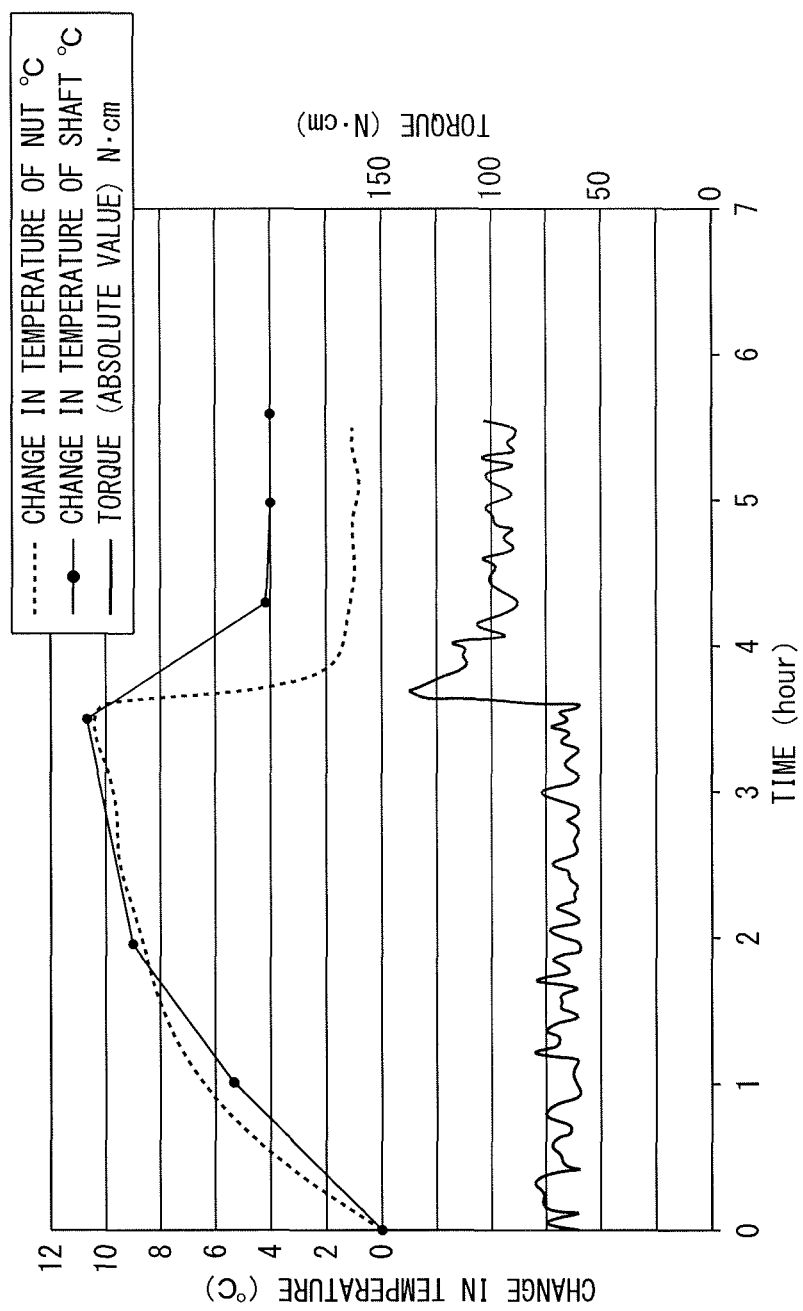
FIG. 5 is a graph showing a result of simultaneous measurement of a value of temperature rise and torque of the nut when the ball screw apparatus according to a comparative example is activated and the nut is cooled.

FIG. 5 is a graph showing a result obtained by driving the ball screw apparatus of a comparative example 1 and by simultaneously measuring a value of temperature rise and torque when the nut is cooled in the course of driving.

A structure of the ball screw apparatus of the first embodiment and a comparative example 1 is shown in TABLE. 1, a driving condition of the first embodiment and the comparative example 1 is shown in TABLE. 2; and a cooling condition of the first embodiment and the comparative example 1 is shown in TABLE. 3.

Figure 6:
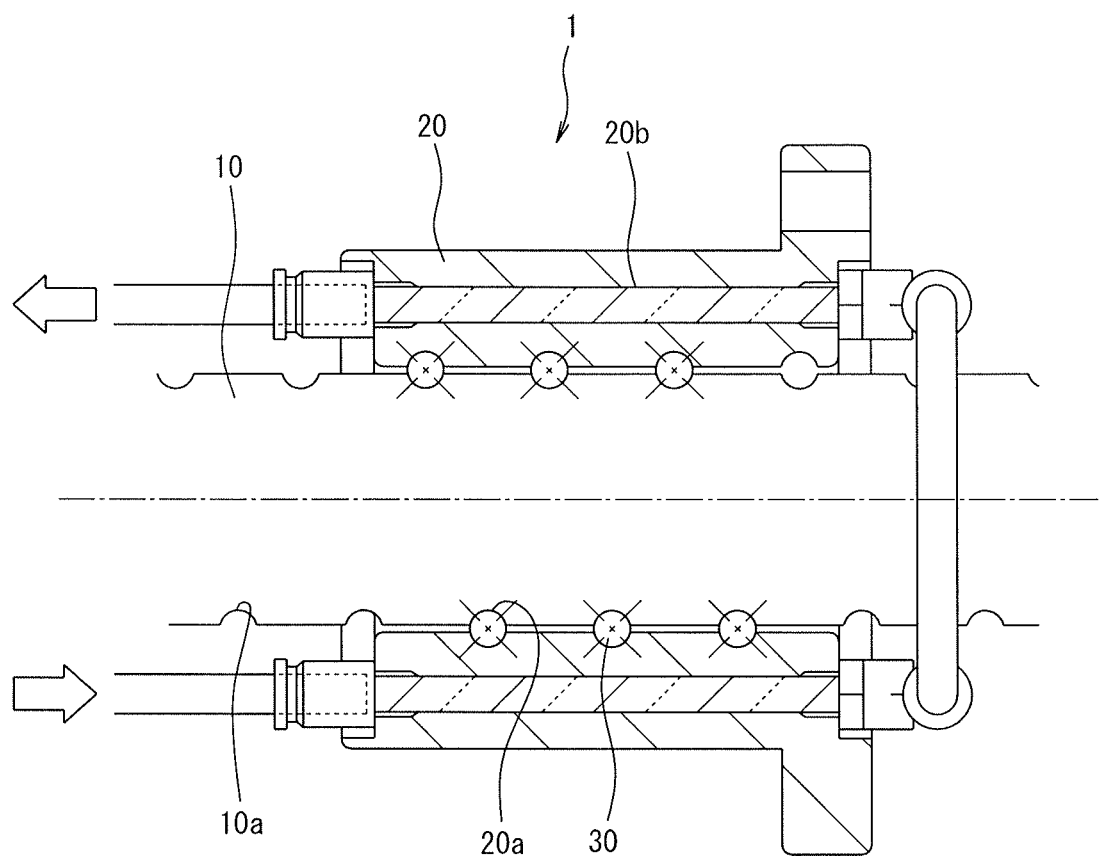
FIG. 6 is a sectional view, along an axial direction, showing a structure of the ball screw apparatus in a comparative example 1.

Herein, the structure of the ball screw apparatus in the comparative example 1 is different from the first embodiment, as shown in FIG. 6, in that the plurality of rolling elements 30 to which the oversize ball preload (four-point contact preload) is applied are disposed between the screw groove 10a and the screw groove 20a.

In FIGS. 4 and 5, cooling starts when the temperature of the nut is suddenly decreased.

TABLE 1

| Specification of ball screw | | |
|---|---|---|
| | Two-point contact ball screw | Four-point contact ball screw |
| Shaft diameter | 50 mm | 50 mm |
| Lead | 25 mm | 25 mm |
| Corundum diameter | 7.1438 mm | 7.1438 mm |
| Effective turns | 2.7roll × 1 line | 2.7roll × 1 line |
| Preload typestyle | Offset lead preload | Oversize ball preload |

TABLE 2

| | Running conditions (common to two-point contact and four-point contact) |
|---|---|
| Testing apparatus | Torque Measuring machine made by NSK |
| Preload | 150 Ncm |
| Average number of revolutions | 241 mm$^{-1}$ |

TABLE 3

| | Cooling conditions | |
|---|---|---|
| | Name of coolant | Cooling oil JX-1 made by NSK |
| Various factors of coolant | Flow rate of coolant | 3 L/min |
| | Kinetic viscosity coefficient | 1.585 mm2/s |
| | Specific gravity | 0.759 |
| | Specific heat | 0.49 Kcal/kgf · ° C. |
| | Thermal conductivity | 0.126 Kcal/m · hr · ° C. |

As shown in FIGS. 4 and 5, while it can be seen, in both the first embodiment and the comparative example 1, that the temperature of the nut decreases when cooling starts, it proves from the above that the ball screw apparatus according to the first embodiment undergoes larger decrease in temperature of the shaft than that of the comparative example 1. A temperature change in the shaft which directly affects table accuracy in the feeding system of the ball screw apparatus driving becomes important.

In addition, taking notice of a change in the torque turns out that the torque is increased in the comparative example 1 up to about twice after cooling. This is because the nut induces heat contraction by cooling, a direction of the heat contraction coincides with the preload direction, and the preload is increased. This heat is a factor of weakening radiation of heat by cooling, resulting in the reduced total cooling effect. What is more, it causes excessive preload with shortened the life of the ball screw apparatus On the contrary, the torque of the ball screw apparatus in the example 1 does not show a even slight change before and after cooling. This is why while the radial direction among the directions of heat contraction of the nut by cooling acts in a direction of increasing the preload, the axial direction acts in a direction of decreasing the preload, and they interact with each other. As a result, the ball screw apparatus of the first embodiment is immune to an influence of the heat contraction of the nut, which accomplishes high cooling effect.

Third Embodiment

Figure 9:
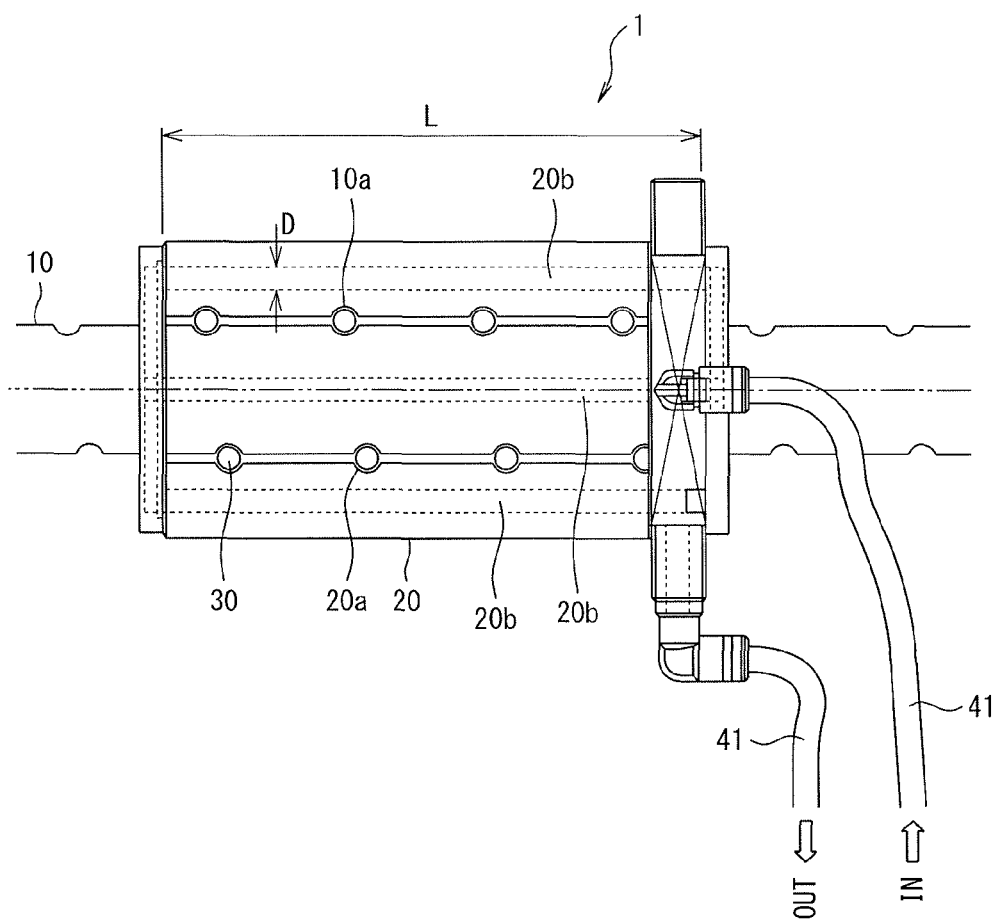
FIG. 9 is a sectional view showing a structure of the ball screw apparatus according to a third embodiment.

FIG. 9 is a side view showing a structure of the ball screw apparatus according to the third embodiment. As shown in FIG. 9, the ball screw apparatus 1 of the third embodiment includes the screw shaft 10 and the nut 20. The screw shaft 10 and the nut 20 are screwed with each other via the plurality of rolling elements 30. The nut 20 is formed in cylindrical shape to have an internal diameter larger than an external diameter of the screw shaft 10. The screw groove 20a is formed on an inner peripheral surface of the nut 20 so as to face the screw groove 10a spirally formed on an outer peripheral surface of the screw shaft 1. The rolling elements 30 are rollable in a rolling path formed by the screw groove 10a and the screw groove 20a.

Further, an axially penetrating through hole 20b is formed in the nut 20 (in FIG. 9, three through holes 20b are axially formed in the nut 20). The through holes 20b are used as a path for coolant and a circulator (not shown) circulating the coolant in the through hole 20b is connected to ball screw apparatus 1. The circulator and the through hole 20b constitute the cooling section 40. The cooling section 40 has a pipe 41 connecting the circulator and the through hole 20b and through which the coolant flows in the through hole 20b and a pipe 41 from which the coolant flows out from the through hole 20b. In this way, circulating the coolant in the through hole 20b by the circulator (not shown) cools down the nut 20.

Here, according to Non-Patent Document 1, when the coolant flows turbulently in the through hole 20b, heat flux Q' is expressed by the following equation (3), when set as follows:

α: heat transfer coefficient

Δθ: difference in temperature between screw shaft 10 and coolant F: area of surfaces contacting with coolant in screw shaft 10

$$Q' = \alpha \cdot \Delta\theta \cdot F \qquad \text{equation (3)}$$

Also, heat transfer coefficient α, and an area F of surfaces contacting with the coolant in the nut 10 is expressed by the following equations (4) and (5), when set as follows:

π: heat transfer coefficient of fluid

D: diameter of through hole 20b $Nu_m$: Nusselt Number

L: length of axial through hole 20b $$\alpha = \frac{\lambda}{D} Nu_m \qquad \text{equation (4)}$$

$$F = \pi d \cdot L \qquad \text{equation (5)}$$

The Nusselt Number $Nu_m$ is expressed by the following equation (6), when set as follows:

$Re_m$: Reynolds Number $Pr_m$; Prandtl Number $$Nu_m = 0.036 Re_m^{0.8} \cdot Pr_m^{1/3} \left(\frac{D}{L}\right)^{0.055} \qquad \text{equation (6)}$$

The Reynolds Number Rem and the Prandtl Number Prm are expressed by the following equations (7) and (8), when set as follows:

$U_m$: flow rate of coolant v: kinetic viscosity of coolant a: heat transfer coefficient of coolant $$Re_m = \frac{D \cdot u_m}{v} \qquad \text{equation (7)}$$

$$Pr_m = \frac{V}{a} \qquad \text{equation (8)}$$

The flow rate $U_m$ of the coolant is expressed by the following equation (9) when set as follows:

w: flow rate of coolant

A: cross section area of through hole 20b $$u_M = \frac{w}{A} \qquad \text{equation (9)}$$

The cross section area A of the through hole 20b is expressed by the following equation (10).

$$A = \frac{\pi D^2}{4} \qquad \text{equation (10)}$$

The heat flux Q' is expressed by the following equation (11) when the above equations (4) to (10) are substituted for the equation (3) and simplified.

$$Q' = 0.109 \cdot \lambda \cdot \Delta\theta \cdot \pi \left(\frac{w}{\nu\pi}\right)^{0.8} \cdot \left(\frac{\nu}{a}\right)^{1/3} \cdot L^{0.945} \cdot D^{-0.745} \qquad \text{equation (11)}$$

Figure 10:
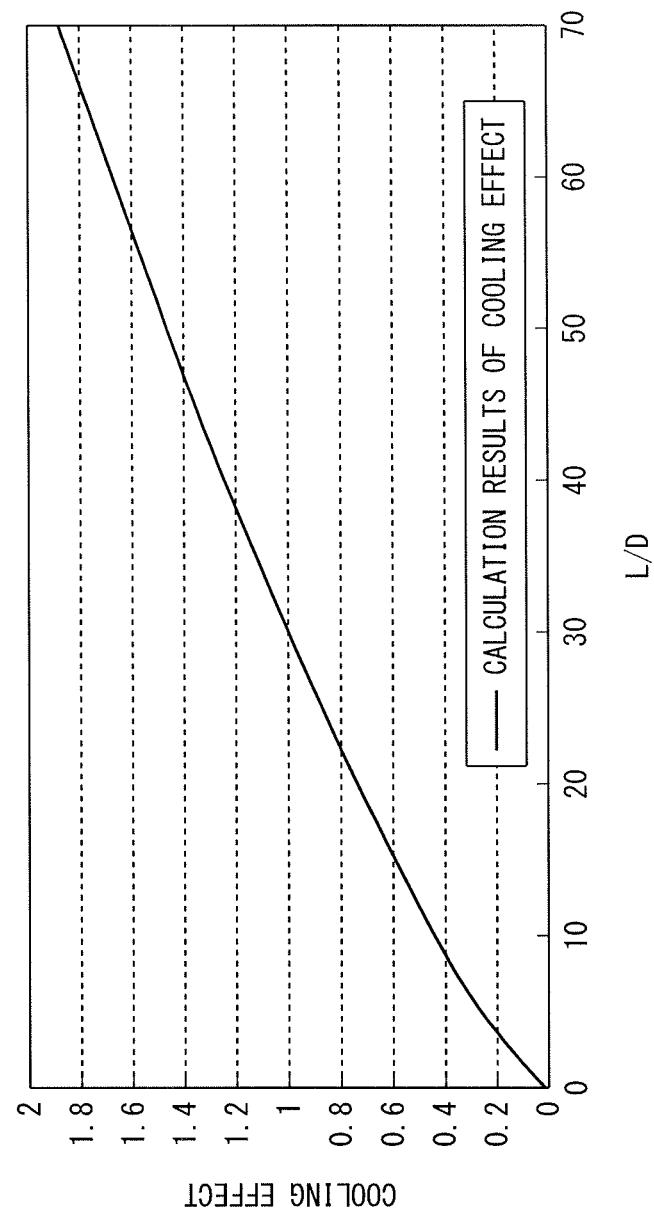
FIG. 10 is a graph showing a relationship between L/D and cooling effect as a calculation result when only the diameter D of the through hole 20*b* is changed, with the axial length L of the thorough hole 20*b* fixed in the first embodiment.

The equation (11) is a function of the length and the diameter of the through hole 20b and the coolant through which the coolant flows on condition that a type of the coolant and the flow rate are constant. It shows that the longer the through hole 20, the more much heat exchange is made, and the smaller the diameter of the through hole 20b, the more much heat exchange is made. In other words, a higher cooling effect is achieved. It can be said that by way of trial replacing this with the design of the nut 20, the larger L/D that is a ratio of the axial length L of the through hole 20b and the diameter D of the through hole 20b, the more higher cooling effect will be achieved. In the actual design of the nut 20, the axial length L of the through hole 20 is in many cases determined by such as load requirements, a required life duration, and required accuracy etc. Above all things, a parameter critical in designing the nut 20 with the cooling section is the diameter D of the through hole 20b.

Where the nut 10 is cooled by flowing the coolant in one through hole 20b, a relationship between the L/D and the cooling effect is shown in FIG. 10 when the axial length L of the through hole 20b is fixed and only the diameter D of the through hole 20b is changed. In FIG. 10, a value of the cooling effect (vertical axis) is represented by a ratio where a value of saturation temperature rise during a simple to-and-fro motion of the ball screws is measured and a value of L/D=30 is taken as a reference (=1). As shown in FIG. 10, it proved that the cooling effect is greatly drops when L/D is less than 10 and almost linearly increases when the L/D is more than 10. From this, it can be seen that the L/D has to satisfy the following equation (12) and that it is desirable to make L/D larger, as far as possible.

$$\left(\frac{L}{D}\right) \geq 10 \qquad \text{equation (12)}$$

Hereupon, comparative evaluation is attempted to the relationship shown in FIG. 12) and the ball screw apparatus 1 experimented under the test conditions listed in the following TABLE. 4.

Figure 11:
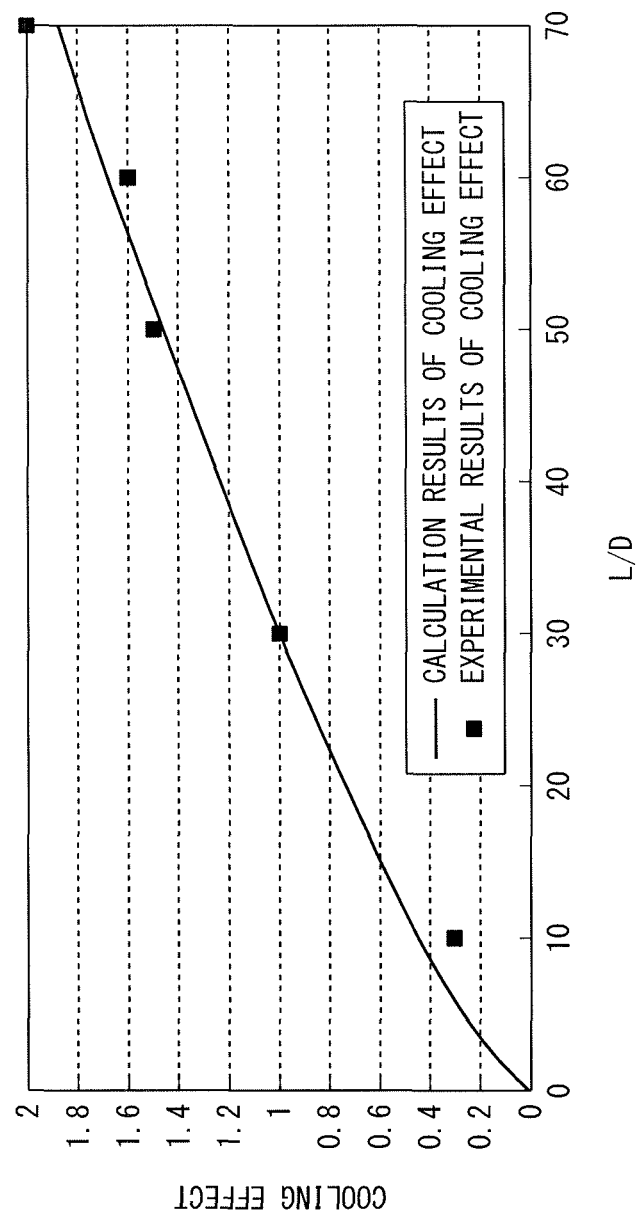
FIG. 11 is a graph showing a relationship between L/D and the cooling effect in which a value of temperature rise in another TP map out together with calculation results in the case where with the value of the temperature rise at TP2 (L/D=30) shown in TABLE. 4 is set as a reference value in the third embodiment.

FIG. 11 is a graph showing, in the third embodiment, a relationship between the L/D and the cooling effect, showing a value of the temperature rise of another TP when the value of the temperature rise at TP2(L/D=30) in TABLE 4 is taken as a standard, together with the calculation results in FIG. 10. As shown in FIG. 11, roughly good match between the experimental results and the calculation results are observed, thereby experimentally demonstrating justificability of the calculation theory.

TABLE 4

| Specimen call No. | NSK ball screw W5011-602ZNR-C5Z25 |
|---|---|
| Sample shaft diameter | φ50 mm |
| Sample lead | 25 mm |
| Name of sample testing unit | Ball screw rolling testing apparatus |
| Sample load | 3000N (preload) |
| lubricant | NSK grease LR3 |
| Maximum number of revolutions | 250 rpm |
| stroke | 750 mm |
| Length L of through hole | 200 mm |
| Diameter D of through hole | TP1 2 0 mm (L/D = 10) |
| | TP2 6.7 mm (L/D = 30) |
| | TP3 4.0 mm (L/D = 50) |
| | TP4 3.3 mm (L/D = 60) |
| | TP5 2.86 mm (L/D = 70) |

From FIG. 11, it is true that when the cooling section is provided to the nut 20, it had better to make a ratio L/D of the diameter of the through hole large as much as possible with respect to the axial length L of the through hole 20b. However, too much ratio conversely causes the following two problems:

(1) Small diameter and long hole machining of the through hole 20b decreases the machining efficiency, leading to higher cost up of the ball screw apparatus; and (2) Pressure loss is made high when the coolant flows.

Figure 12:
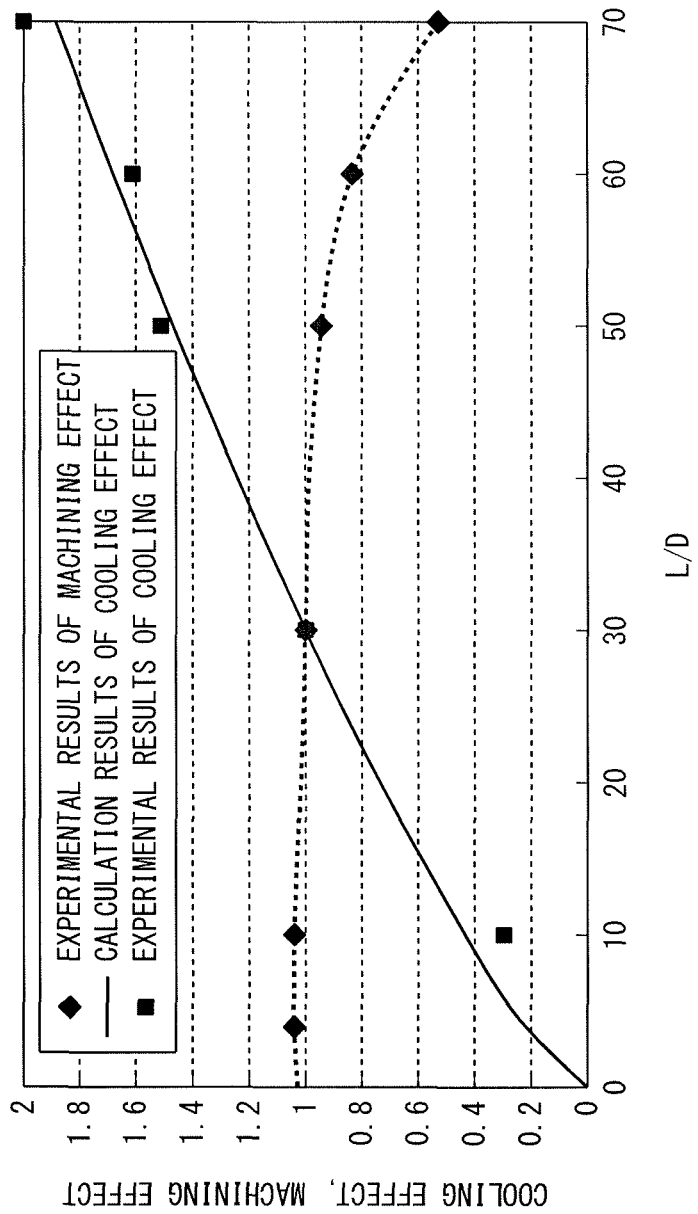
FIG. 12 is a graph showing a relationship among L/D, cooling effect, and machining efficiency when the machining efficiency is verified from the maximum feeding speed machinable while keeping a profile of the through hole 20*b* and surface toughness thereof unchangeably in the third embodiment.

Herein, since the relationship between the ratio L/D of the diameter of the through hole relative to the axial length L of the through hole 20b and the machining efficiency, in machining the above nut 20 in terms of the forgoing problem (1) has established, the results are shown in FIG. 12 by overlapping those on in FIG. 11. In FIG. 12, a value of the machining efficiency indicated by the vertical axis is represented by a ratio in which a machining time of the through hole 20b taken at the maximum feeding speed machinable, while maintaining a profile and surface roughness of the through hole 20b is found with a value of L/D=30 as a reference (=1).

From FIG. 12, it can be seen that the machining efficiency is suddenly dropped near a point where L/D exceeds 60. This is due to necessity of slowing down machining speed in order to prevent tool breakage for reasons of lowered tool rigidity attributable to miniaturization of the diameter of the tool, and of an increased extraction operation (non-machining time) for evacuation of chips attributable to long and large machining. Accordingly, it is desirable for the range of L/D to meet the following equation (13).

$$\left(\frac{L}{D}\right) \leq 60 \qquad \text{equation (13)}$$

Pressure loss h at inlet and outlet of fluid flowing through turbulently within the through hole 20b is expressed by the following equation (14), when set as follows:

ζ: friction loss coefficient in through hole 20b

ρ: density of fluid $u_m$: flow rate $$h = \zeta \frac{L}{D} \cdot \frac{\rho \cdot u_m^2}{2} \qquad \text{equation (14)}$$

Here, a relationship among the pressure loss and flow rate w, and the diameter D of the through hole 20b is given by according to the equations (9) and (10) when the flow rate is constant.

$$h \propto \frac{w^2}{D^5} \qquad \text{equation (15)}$$

Figure 13:
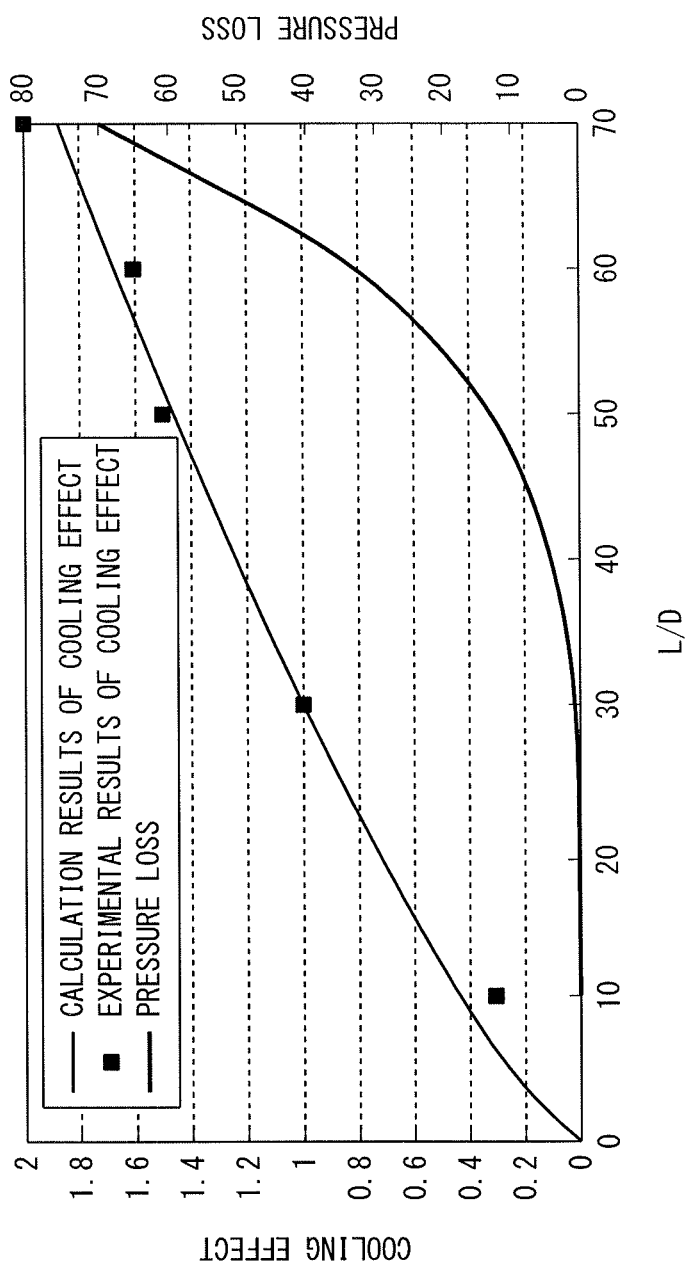
FIG. 13 is a graph showing a relationship among L/D, cooling effect, and pressure loss when heat flux Q' is constant in the third embodiment.

Herein, a relationship among the L/D, the cooling effect, and the pressure loss when the flow rate Q' is constant is shown in FIG. 13. FIG. 13 is a view shown by overlapping the relationship between L/D and the pressure loss when flow rate Q' is constant on FIG. 11, where the pressure loss is indicated by the axis of the right side. From this, it can be seen that the pressure loss is suddenly increased near a point where L/D exceeds 40.

When the ball screw apparatus 1 is cooled, it needs to supply coolant cooled by the cooling section with a pump and a chiller to the ball screw apparatus. In order for the cooling section to make its dimension more compact and to suppress generation of heat from the cooling section itself, it is mandatory to reduce as much as possible the pressure loss within the ball screw apparatus 1.

Namely, it is preferable for the range of L/D to meet the following equation (16).

$$\left(\frac{L}{D}\right) \leq 40 \qquad \text{equation (16)}$$

From the above results, to cope with both the cooling effect with the machining efficiency of the nut 20 in the ball screw apparatus 1 having the structure for cooling the nut 20, it is desirable for a ratio between the axial length L of the through hole 20 and the diameter D of the through hole 20b to fall within the range of the according to equation (A) rather than the equations (12) and (13).

$$10 \leq \left(\frac{L}{D}\right) \leq 60 \qquad \text{equation (A)}$$

Moreover, to achieve load reduction of the cooling section, endeavoring to fall the L/D within the range of the following equation (17), according to the equations (12) and (15), allows providing an ideal ball screw apparatus 1 cope with both the cooling effect and the total cost efficiency.

$$10 \leq \left(\frac{L}{D}\right) \leq 40 \qquad \text{equation (17)}$$

In the above description, a calculation is made to the ball screw apparatus in which one through hole is formed in the nut. Instead, in a ball screw apparatus where a plurality of through holes are juxtaposed in their axial direction in the nut and these through holes are connected, the above equations have only to be calculated by replacing L with 4L in the equations (e.g., in the case where four through holes are formed in parallel in the nut).

Fourth Embodiment

A description of the ball screw apparatus 1 according to the fourth embodiment will next be made referring to the drawings.

Note that the ball screw apparatus according the fourth embodiment is only different from the second embodiment (see FIG. 3) in its installation aspect of the spacer 50 relative to the first nut 20 and the second nut 30. Therefore, the similar constituent elements to which the same reference numeral as those in the second embodiment is assigned omits their description for brevity's sake.

Figure 14A:
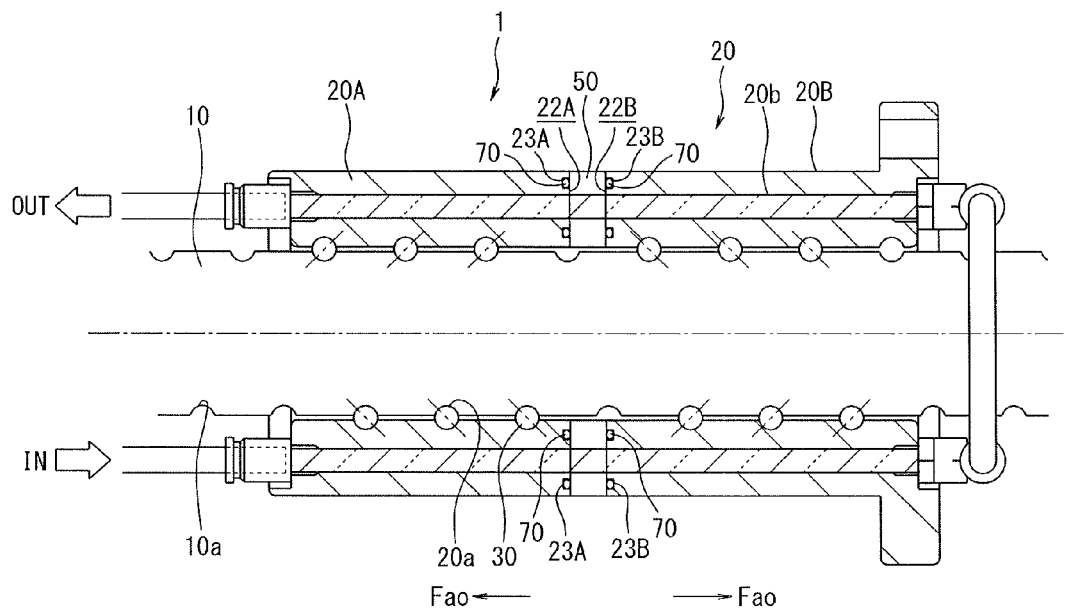
FIG. 14 is a sectional view showing a structure of the ball screw apparatus according to a fourth embodiment.
Figure 14B:
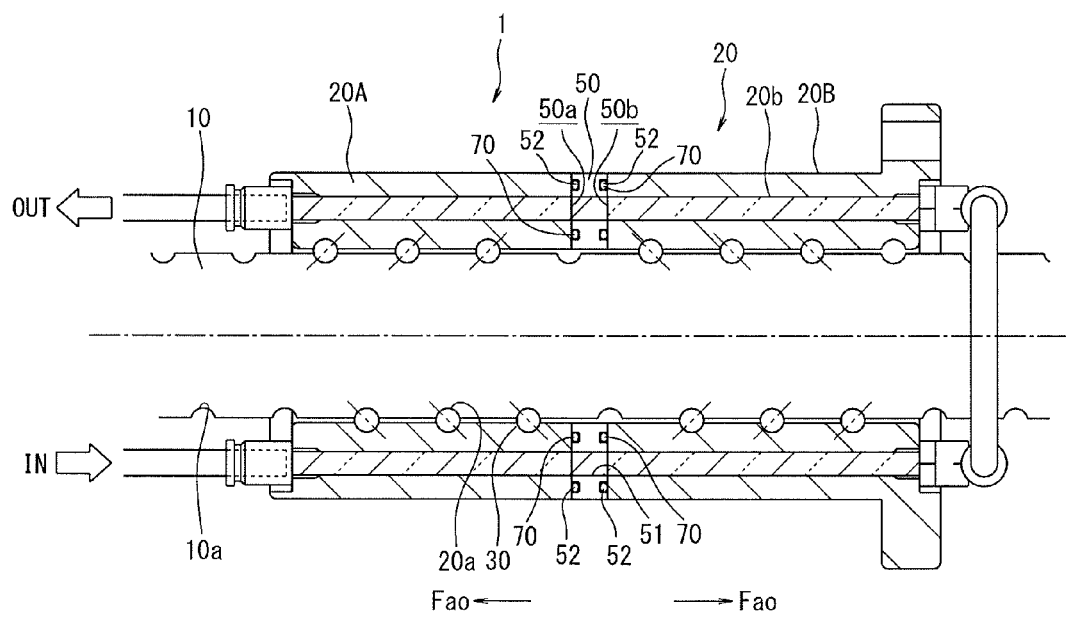

FIGS. 14A and 14B are sectional views showing a structure of the ball screw apparatus according to the fourth embodiment. FIG. 14B is modification to FIG. 14A.

As shown in FIG. 14A, an O-ring 70 is provided between the two nuts (the first nut 20A and the second nut 20B) constituting the nut 20 and the spacer 50. More specifically, ring-shaped first receiving parts 23A and 23B are provided at contact surfaces 21A and 21B with each of the spacer 50 of the first nut 20A and the second nut 20B so as to encircle one opening (contact surfaces 22A and 22B side) of the through holes 20b and 20b. The ring-shaped O-ring 70 encircling the through holes 20b and 20b is accommodated in the first receiving parts 23A and 23B. In this manner, providing the O-ring between the first nut 20A and the second nut 20B, and the spacer 50 offers a high sealing structure where no leakage of the coolant therefrom occurs. Alternatively, provided that the O-ring provides satisfactory sealing with the spacer 50, the O-ring may be either the first nut 20A or the second nut 20Bm, and so need not necessarily providing the both of the first receiving parts 23A and 23B.

Further, as modification of the ball screw apparatus shown in FIG. 14A, the O-ring 70 which is generally provided between the spacer 50 and the nuts 20A and 20B may be provided at the spacer 50 side. Specifically speaking, a ring-shaped second receiving part (convex) may be provided to each of one surface 50a facing the first nut 20A in the spacer 50 and of the other surface 50b facing the second nut 20B in the spacer 50, so as to encircle one opening of the through hole 51, and the O-ring 70 is set up in these second receiving parts 52. If sufficient sealing is accomplished in either of the first nut 20A or the second nut 20B, the O-ring 70 may be provided on either one surface 50a or the other surface 50b, and there is no need of necessarily providing the second receiving part 52 and 52 on both surfaces 50a and 50b.

The provision of the O-ring 70 e.g. at the spacer side 50 has only to fabricate the second receiving part 52 at the spacer 50 side. This diverts the conventional nut to the fourth embodiment as it is, thus reducing a manufacturing cost.

Fifth Embodiment

A description of the ball screw apparatus 1 of the fifth embodiment will next be made referring to the drawings.

The ball screw apparatus according to the fifth embodiment is intended to go into detail the structure of the through hole 20b in the abovementioned fist embodiment. Therefore, the similar constituent elements to which the same reference numeral as those in the second embodiment is assigned omits their description for brevity's sake.

FIG. 15 is a sectional view showing a structure of the ball screw apparatus according to the fifth embodiment.

Figure 15A:
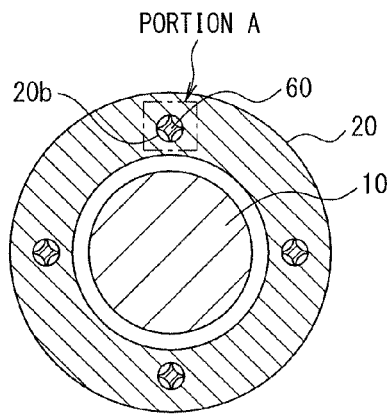
FIG. 15A is a sectional view taken along a line 15*a*-15*a* shown in FIG. 1
Figure 15B:
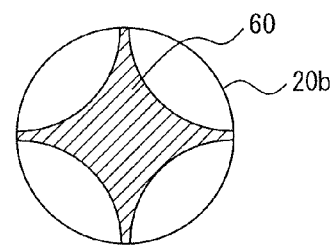
FIG. 15B is an enlarged view of a part A shown in FIG. 15A.

FIG. 15A is a sectional view taken along the line 15a-15a in FIG. 1 and FIG. 15B is an enlarged view, magnified at A in FIG. 15A. FIG. 16 is a perspective view showing a structure of an interpolation member of the ball screw apparatus according to the fifth embodiment.

As shown in FIG. 15A, in the fifth embodiment, the interpolation member 60 extending in a longitudinal direction of the through hole 20b is arranged inside the through hole 20b. A cross section of the interpolation member 60 is formed to reduce a cross section area of a flowpath of the through hole 20b and a contact area with the inner peripheral surface of the through hole 20b as much as possible. Specifically, as shown in FIG. 15B, the interpolation member 60 having a diamond-shaped cross section is arranged inside the through hole 20b. The interpolation member 60 having the diamond-shaped cross section extends in a longitudinal direction of the through hole 20b and contacts at four points with the interior of the through hole 20b at a cross section of the through hole 20b.

The shape of the interpolation member 60 is not specifically limited to a particular shape as long as the interpolation member extends in a longitudinal direction of the through hole 20b, reduces the cross section area of the flowpath of the through hole 20b, and contact area of the through hole 20b with the inner peripheral surface is small as much as possible.

Furthermore, the interpolation member 60 may have a cross section shape dividing the through hole 20b into plural flowpaths in its longitudinal direction.

A concrete shape of the interpolation member 60 will be shown in FIGS. 16A to 16F.

Figure 16A:
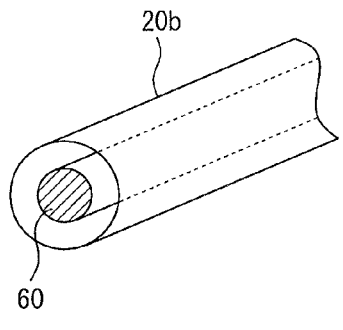
FIG. 16 is a perspective view showing a structure of an interpolation member of the ball screw apparatus according to the fifth embodiment.

The interpolation member 60 shown in FIG. 16A has a round cross section, extends in a longitudinal direction of the through hole 20b, and provided inside the through hole 20b so as not to contact with the interior of the through hole 20n at the cross section of the through hole 20b. It should be noted that some interpolation member 60 does not provide the plural flowpaths within the through hole 20b.

Figure 16B:
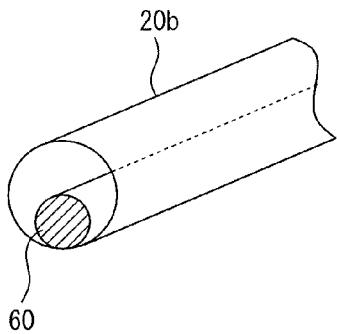

The interpolation member 60 shown in FIG. 16B has a round cross section, extends in a longitudinal direction of the through hole 20b, and arranged inside the through hole 20b so as to contact at one point with the interior of the through hole 20b in the cross section of the through hole 20b. It should be noted that some interpolation member 60 does not provide the plural flowpaths within the through hole 20b.

Figure 16C:
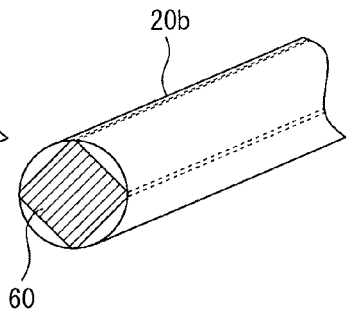

The interpolation member 60 shown in FIG. 16C, has a rectangular cross section, extends in a longitudinal direction of the through hole 20b, and arranged inside of the through hole 20b so as to form four flowpaths in contact at four points with the interior of the through hole 20b in the cross section of the through hole 20b.

Figure 16D:
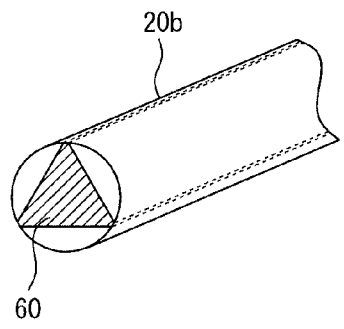

The interpolation member 60 shown in FIG. 16D has a triangular cross section, extends in a longitudinal direction of the through hole 20b, and arranged inside the through hole 20b so as to form three flowpaths in contact at three points with the interior of the through hole 20b in the cross section of the through hole 20b.

Figure 16E:
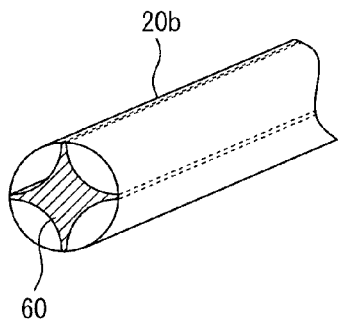

The interpolation member 60 shown in FIG. 16E has a diamond-shaped cross section that is the interpolation member 60 having the cross section shown in FIG. 15B, extends in a longitudinal direction of the through hole 20b, and arranged inside the through hole 20b so as to form four flowpaths in contact at four points with the interior of the through hole 20b in the cross section of the through hole 20b.

Figure 16F:
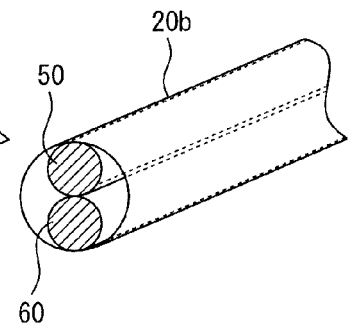

The interpolation member 60 shown in FIG. 16F has a cross section which presents an appearance of contacting two circles, longitudinally extends, and provided inside the through hole 20b so as to form two flowpaths in contact at two points with the interior of the through hole 20b in the cross section of the through hole 20b.

Among the interpolation members 60 shown in FIGS. 16A to 16F, the interpolation member 60 shown in FIGS. 16C to 16F forms plural flowpaths having a small cross section within the through hole 20b, which may have an effect of speeding up the flow rate of the coolant. However, where the circulator (not shown) has small press-feeding capacity, too large cross section area of the interpolation member 60 precludes making the flow rate faster due to pipe resistance. Thus, the shape (cross section and contact area with the interior of the through hole 20) of the interpolation member 60 should be determined depending on the press-feeding capacity of the circulator.

Since heat exchange between a cooling object (nut 20) and the coolant within the through hole 20b is made in the interior surface of the through hole 20b, it is desirable for the shape of the interpolation member 60 to have less areas contacting the inner peripheral surface of the through hole 20b. That is, it is preferable to adopt the interpolation member 60 having the configuration shown in FIG. 16D than that shown in FIGS. 16C and 16E, more preferable the interpolation member 60 having the configuration shown in FIG. 16F, even more preferable the interpolation member 60 having the configuration shown in FIG. 16B, and most preferable the interpolation member 60 having the configuration shown in FIG. 16A.

Herein, the Reynolds Number $Re_m$ bearing upon the cooling effect is typically expressed by the following equation (18) when set as follows:
$U_m$: flow rate of coolant
v: dynamic viscosity of coolant
a: heat transfer coefficient of coolant $$Re_m = \frac{D \cdot u_m}{v} \qquad \text{equation (18)}$$

Herein, where the flow rate $U_m$ of the coolant is expressed by the following equation (19) when set as follows:
w: flow rate of coolant
A: cross section area of through hole 20b $$u_m = \frac{w}{A} \qquad \text{equation (19)}$$

The cross section area A of the through hole 20b is expressed by the following equation (20).

$$A = \frac{\pi D^2}{4} \qquad \text{equation (20)}$$

When the above equations (19) and (3) are substituted for the equation (18) and simplified, the Reynolds Number $Re_m$ is expressed by the following equation (21).

$$Re_m = \frac{4w}{\pi v D} \qquad \text{equation (21)}$$

Thereby, it can be seen that when the flow rate w of the coolant is constant, the smaller the diameter D of the through hole 20b, the larger the Reynolds Number $Re_m$ expressed by the equation (21). However, when the diameter D of the through hole 20b is decreased, it has to fall within the range where excessive pressure loss will not be occurred.

Meanwhile, heat exchange between the cooling object (nut 20) and the coolant within the through hole 20b is proportional to a contact area between the cooling object (nut 20) and the coolant within the through hole 20b.

Taking these points into account, it will be understood that an effective cooling method of the cooling object (nut 20) is to decrease the diameter D of the through hole 20b for increasing the Reynolds Number $Re_m$, and to increase the number of the through hole 20b for increasing the contact area. Notwithstanding, forming the through hole 20b of which cross section area is small and increasing the number of the through hole 20b invites degradation of the machining efficiency, leading to significant cost up consequently.

Therefore, in the fifth embodiment, the structure is implemented providing the increased Reynolds Number $Re_m$ by arranging the interpolation member 60 inside the through hole 20b, forming the through hole having small diameter by virtue of the arrangement of the interpolation member 60, and increasing the contact area.

With this structure, the diameter D of the through hole 20b is replaced by the equivalent diameter $D_e$ and is expressed as in the following equation (22). Herein, in the following equation (22), the equivalent diameter $D_e$ denotes the diameter of a circle when considering the circle having the same cross section area with that of flowpath of the coolant. In other words, the larger the cross section area of the interpolation member, the smaller the equivalent diameter $D_e$, ending in increasing (enhancement of the cooling effect) the Reynolds Number Rem found by substituting the equivalent diameter $D_e$ for D in the Equation (21). An attention should be paid to that the diameter D of the through hole formed in the nut is not changed and hence the machining efficiency is invariant. In equation (22), $A_d$ is a cross section area of the flowpath and $L_{wet}$ denotes the length from which the length obtained by subtracting the contact area at which the interpolation member is contacted the interior of the through hole from the length of circumference of the through hole. Namely, in the installation aspect shown in the FIGS. 16A to 16F, $L_{wet}$ is identical to the length of circumference in the aspect of FIG. 16A; $L_{wet}$ is approximately equal to the length of circumference of the through hole in FIGS. 16B and 16F; $L_{wet}$ is identical to the length from which the length of the four contact areas at which the interpolation member is contacted with the interior of the through hole is subtracted from the length of circumference of the through hole in the aspect in FIGS. 16C and 16E; and $L_{wet}$ is identical to the length from which the length of three contact areas at which the interpolation member is contacted with the interior of the through hole is subtracted from the length of circumference of the through hole in the aspect shown in FIG. 16D.

$$D_e = \frac{4A_d}{L_{wet}} \quad \text{equation (22)}$$

As explained in the above, according to the ball screw apparatus 1 of the fifth embodiment since the interpolation member 60 extending in a longitudinal direction of the through hole 20b is arranged in the through hole 20b, the fifth embodiment enables reducing the cross section area of the flowpath of the through hole 20b, while securing a large area at which the coolant flowing through the through hole 20b contacts with the through hole 20b. Hence, the fifth embodiment may provide the ball screw apparatus 1 which attains the cooling effect as high as possible, and will not cause an excessive decrease in the machining efficiency.

Further, in the ball screw apparatus 1 of the fifth embodiment, the interpolation member 60 has the cross section shape dividing the through hole 20b into the plural flowpaths in its longitudinal direction. This forms the plural flowpaths of the through hole 20b of which cross section area is reduced while ensuring the large area at which the coolant and the through hole contact with each other, which speeds up the flow rate of the coolant and more effectively decreases degradation of the machining efficiency. Hereupon, the structure of the fifth embodiment is capable of providing the ball screw apparatus 1 which guarantees the higher cooling effect and prevents an excessive decrease in degradation of the machining efficiency even by applying the fifth embodiment to the ball screw apparatus in which one through hole is formed in the nut, and by applying the fifth embodiment to the ball screw apparatus in which the plurality of through holes are formed in the nut.

Sixth Embodiment

A description will lastly made to the ball screw apparatus according to the sixth embodiment referring the drawings.

Figure 17:
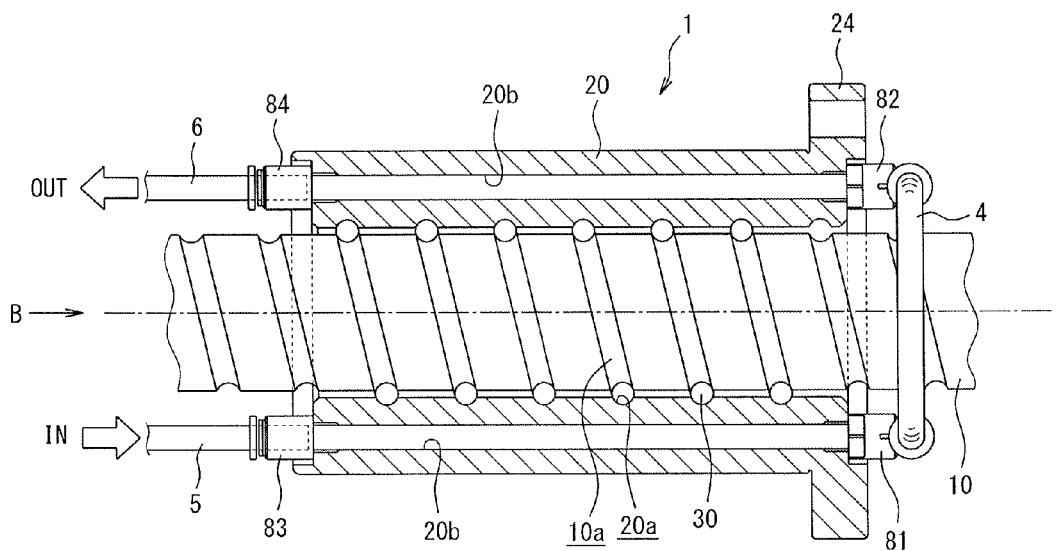
FIG. 17 shows the ball screw equivalent to a six embodiment in which only the nut is shown by a sectional view.
Figure 18:
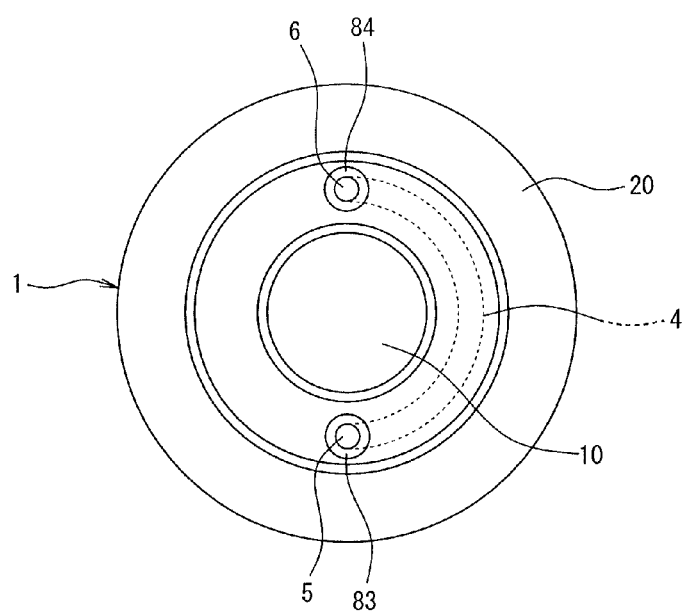
FIG. 18 is an arrow view of the ball screw apparatus shown in FIG. 17, viewed from a direction of B.
Figure 19:
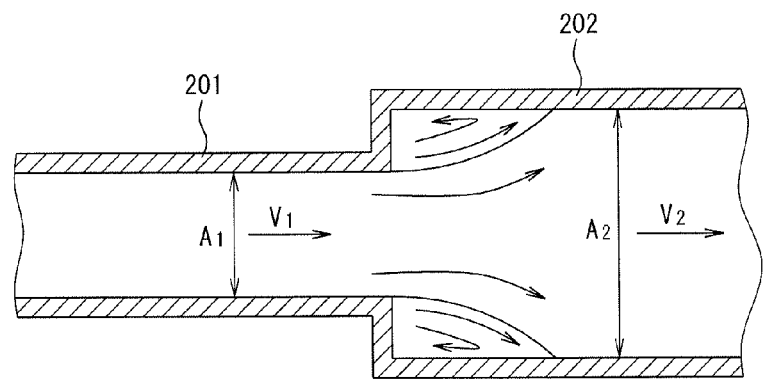
FIG. 19 explains pressure loss incidental to a change in a cross section of flowpath in which a cross section area of flowpath of upstream side is smaller than that of flowpath of downstream side.
Figure 20:
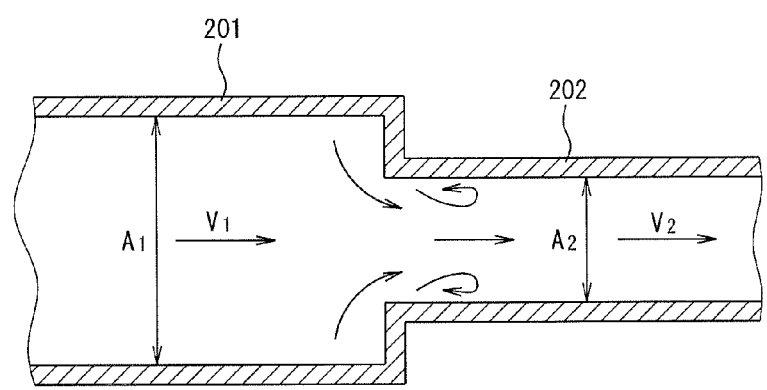
FIG. 20 explains pressure loss incidental to a change in a cross section of flowpath in which a cross section area of flowpath of upstream side is larger than that of flowpath of downstream side.
Figure 21:
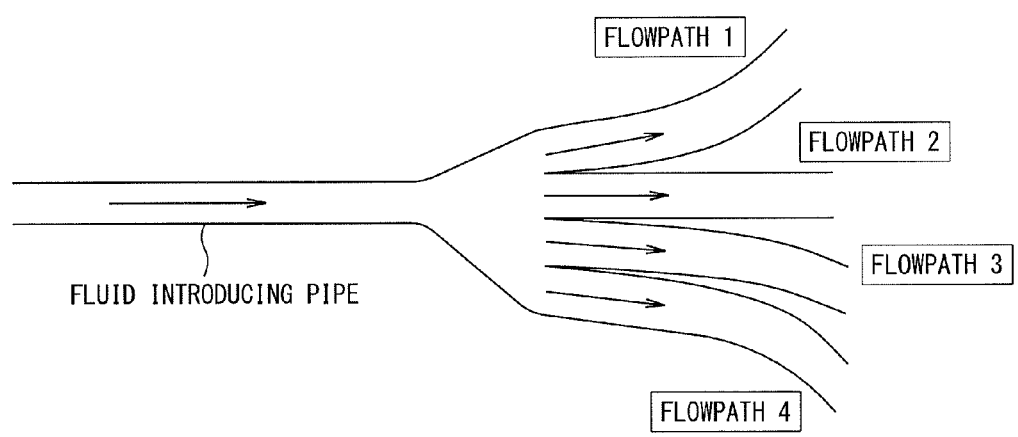
FIG. 21 explains a change in flow rate incidental to a change in cross section of flowpath in which four flowpaths having the same cross section one another are connected in parallel with a fluid introducing pipe.

FIG. 19 explains pressure loss incidental to a change in the cross section of the flowpath, showing the case where the cross section area of upstream side is less than that of downstream side. FIG. 20 explains the pressure loss incidental to a change in the cross section of the flowpath, showing the case where the cross section area of the flowpath of the upstream side is larger than that of the flowpath of the downstream side. FIG. 21 explains a change in the flow rate incidental to a change in the cross section of the flowpath, showing the case where the four flowpaths having the same cross section are connected in parallel with a fluid introducing pipe. FIG. 22 explains how to provide inlet and outlet of the flowpath in the ball screw according to the embodiment, showing an example (a) of high cooling effect and an example (b) of low cooling effect. FIG. 17 is an arrow view of the ball screw apparatus shown in FIG. 16, viewed from a direction of B.

The ball crew apparatus according to the sixth embodiment includes the nut of which a spiral groove is formed on an inner peripheral surface, the screw shaft of which a spiral groove is formed on outer peripheral surface, and balls disposed between a raceway groove formed by the spiral groove of the nut and the spiral groove of the screw shaft. The plurality of through holes (for cooling) axially perforating the nut are formed in the nut. Adjoining through holes have the substantially same or the same cross section and the cross section area each other. These through holes are connected in series to form the flowpath with a flowpath forming member having the substantially same or the same cross section and the cross section area of the flowpath at the axial end of the nut. Coolant introducing pipe and coolant discharging pipe whose cross section and cross section area of the flowpath are the same or the substantially same are connected in series at the inlet and the outlet of the flowpath.

Such structure allows providing the ball screw apparatus which sustains small pressure loss of the coolant flowing through the flowpath and attains higher cooling effect as compared with that in which a flowpath is formed by connecting the adjoining through holes with the flowpath forming member whose cross section area is different from the through holes.

Hereafter, a description will be made in detail to the sixth embodiment referring to the drawings.

As shown in FIG. 17, the ball screw of the sixth embodiment includes the nut 1, the screw shaft 2, balls 3, and semi-circular tube (flowpath forming member) 4, a coolant introducing pipe (coolant media introducing pipe) 5, a coolant discharging pipe (coolant media discharging pipe) 6, and connectors 81 to 84. In FIG. 17, a ball recirculating member and a seal are not shown therein.

The spiral groove 20a is formed on an inner peripheral surface of the nut 20 and the spiral groove 10a is formed on an outer peripheral surface of the screw shaft 10. The balls 30 are disposed between a raceway groove formed by the spiral groove 20a of the nut 20 and the spiral grove 10a of the screw shaft 10. A flange 24 is provided on one axial end of the nut 20.

Two through holes 20b and 20b axially perforating the nut 20 are formed in the nut 20 at a position opposing in the diametrical direction of the nut 20. These through holes 20b and 20b are connected at the end of the flange 24 side of the nut 20 via the semi-circular tube 4. The one end of the tube 4 and the through hole 20b are connected by a connector 81 and the other end of the tube 4 and the through hole 20b are connected by a connector 82. This forms a flowpath formed by the through holes 20b and 20b and the tube 4.

The end of the through hole 20b to which the tube 4 is not connected is connected to the coolant introducing pipe 5 via the connector 83, and the end of the through hole 20b to which the tube 4 is not connected to is connected to the coolant discharging pipe 6 via the connector 84. In other words, the inlet and the outlet of the flowpath are provided at the end to which the tube 4 of the through holes 20b and 20b are not connected.

Thereby, the coolant flows through in the following order: the coolant introducing pipe 5→the connector 83→the through hole 20b of the nut 20→the connector 81→the tube 4→the connector 82→the through hole 20b of the nut 20→the connector 84→the coolant discharging pipe 6. During flowing of the coolant, the nut 20 is cooled down directly by flow of the coolant in the through holes 20b and 20b.

According to the ball screw of the sixth embodiment, in all of the flowpath formed by the through holes 20b and 20b of the nut 20 and the tube 4, the coolant introducing pipe 5 connected to the inlet and outlet of the flowpath, and the coolant discharging pipe 6, they have the same flowpath cross section (cross section and cross section area of the flowpath). The sameness decreases the pressure loss of the coolant, which enhances the cooling efficiency and simultaneously lightens the burden of the coolant supplying pump.

Since the two through holes 20b and 20b are connected in series to the coolant introducing pipe 5, the flow rate is held constant. This enhances the cooling effect as compared with the case where the flowpath cross section becomes large at a junction and slows down the flow rate, as in the case where the two through holes 20b and 20b are connected in parallel to the coolant discharging pipe 5.

An operation and effect of the sixth embodiment will be explained below.

The pressure loss incidental to a change in the cross section area of the flowpath will firstly be explained.

As shown in FIG. 19, where a cross section area $A_1$ of the flowpath 201 of the upstream side is less than a cross section area $A_2$ of the flowpath 202 of the downstream side, a loss head h' is expressed by the following equation (23) according to the Bernoulli's principle when letting an average flow rate of the flowpath 201 be $V_1$, an average flow rate of the flowpath 202 be $V_2$, and a gravitational acceleration be g.

$$h=(V_1-V_2)/2g=\zeta \cdot V_1^2/2g \qquad \text{equation (23)}$$

where $\zeta=(1-A_1)/A_2)^2$

From the equation (23), it can be seen that the loss head h is minimized when $A_1 \approx A_2$ As shown in FIG. 20, where the cross section area $A_1$ of the flowpath 201 of the upstream side is larger than the cross section area $A_2$ of the flowpath 202 of the downstream side, the loss head h is expressed by the following equation (24) according to the Bernoulli's principle when letting an average flow rate of the flowpath 201 be $V_1$, an average flow rate of the flowpath 201 be $V_2$, and a gravitational acceleration be g.

$$h'=(V_2-V_1)/2g=\zeta' \cdot V_2^2/2g \qquad \text{equation (24)}$$

where, $\zeta'=(A_1/A_2-1)^2$

From the equation (24), it can be seen that the loss head h' is minimized when $A_1 \approx A_2$ From the above, it can be seen that equalizing the cross section area $A_1$ of the flowpath 201 of the upstream side to the cross section area $A_2$ of the flowpath of the downstream side enables reduction of the pressure loss.

On that account, equalizing or roughly equalizing as can as possible the flowpath formed by the through hole of the nut and the flowpath forming member, and the cross section and the cross section area of the flowpath of the pipe connected to the inlet and outlet thereof allows reducing the pressure loss of the coolant at the inlet and outlet and within the flowpath.

Especially demonstrating the e reducing ffect of the pressure loss is the case where one having high viscosity such as oil (dynamic viscosity is more than 1.585 mm²/s) is flown and the case where one is turbulent flow (Reynolds Number is more than 3000).

A description will be made to a change in the flow rate incidental to a change in the cross section area of the flowpath.

As shown in FIG. 21, when four flowpaths having the same cross section and the cross section area are connected in parallel to the fluid introducing pipe having the same cross section and the cross section area, the cross section area of the flowpath increases fourfold compared with the respective flowpaths at the junction. On the contrary, when the four flowpaths having the same cross section and the cross section area are connected in series and the fluid introducing pipe having the same cross section and the cross section area is connected to one end thereof, the cross section area of the flowpath show no changes.

Flow velocity V is expressed by the following equation (25) when letting the flow rate be Q and the cross section area of the flowpath be A:

$$V=Q/A \qquad \text{equation (25)}$$

From the equation (25), it can be seen that since the faster the flow velocity of the coolant, the larger the discharge heat quantity, the larger the cross section area of the flowpath, the more decreasing the cooling effect to the contrary.

From the above, it is discovered that when connecting the plural cooling flowpaths, serial connection not parallel connection achieves higher cooling effect.

Figure 22A:
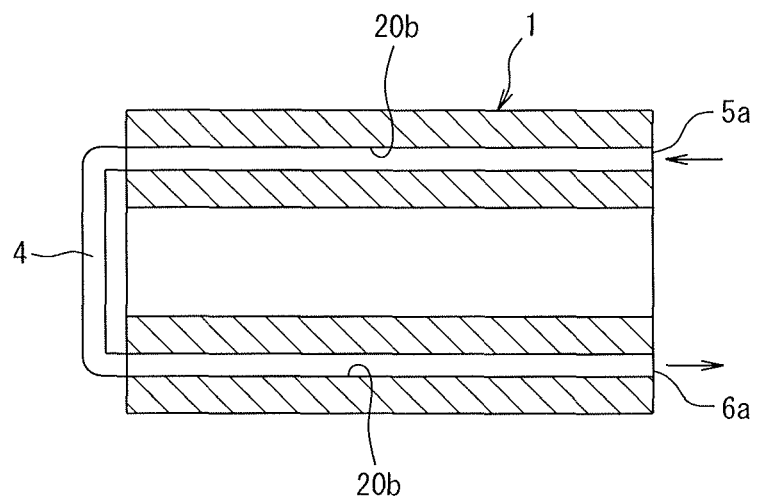
FIG. 22 explains how to provide an inlet and an outlet of flowpath of the ball screw apparatus according to the sixth embodiment in which an example (a) is with high cooling effect and an example (b) is with low cooling effect.

Accordingly, as shown e.g. in FIG. 22A, the connection of the through holes 20b and 20b of the nut 20 by the flowpath forming member 4 to from the flowpath, and the provision of the inlet 5a and the outlet 6a of the flowpath at the portion where the through holes 2a and 2b are not connected by the flowpath forming member 4 of the through holes 20b and 20b provides connection of the two through holes 20n and 20b in series. Doing this, the through holes 20b and 20b may have the same cross section of the flowpath (cross section shape and cross section area) from the inlet 5a to the outlet 6a of the flowpath.

Figure 22B:
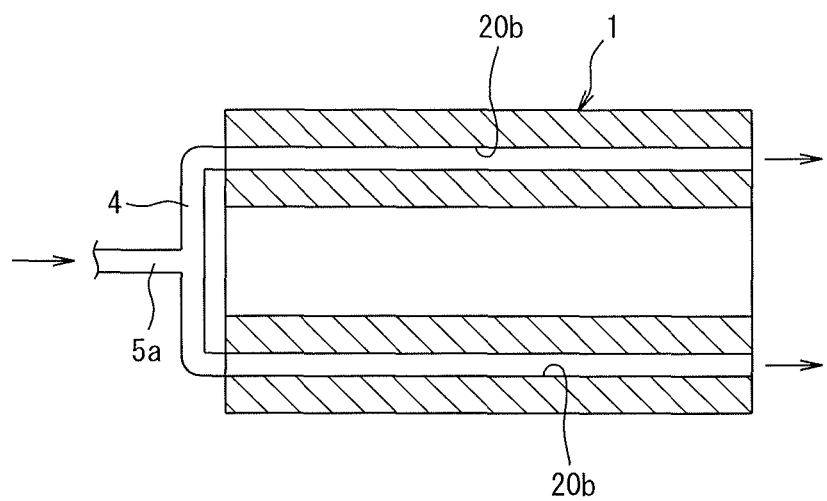

Contrarily, as shown e.g. in FIG. 22B, where the inlet 5a of the flowpath is provided to the flowpath forming member 4 and the two through holes 20b and 20b are connected in parallel, the cross section of the flowpath temporarily increases at the junction to each through hole 20b and 20b. Comparing with this case reveals that the example shown in FIG. 22A exhibits high cooling effect, since no change in the cross section area of the flowpath is not observed, and a constant flow rate is ensured.

While the embodiments of the present invention has made, the invention may have various modifications and improvements without being necessarily limited thereto.

REFERENCE SIGNS LIST

1: ball screw apparatus
10: screw shaft
20: nut
30: rolling element
40: cooling apparatus

The invention claimed is:

1. A ball screw apparatus, comprising:
   a screw shaft;
   a nut screwed with the screw shaft via a plurality of rolling elements; and
   a cooling section for cooling the nut, wherein
   the nut is a double nut where two nuts are connected via a spacer;
   a through hole through which coolant flows from the cooling section is formed in the two nuts and the spacer;
   an O-ring is provided at an opening of the through hole of the spacer so as to encircle the through hole of the spacer; and
   the plurality of rolling elements to which preload in an opposite direction to a contraction direction of the nut, produced when the nut is cooled, are disposed between a screw groove of the screw shaft and a screw groove of the nut.

2. A ball screw apparatus comprising:
   a screw shaft;
   a nut screwed with the screw shaft via a plurality of rolling elements; and
   a cooling section for cooling the nut, wherein
   the plurality of rolling elements to which preload in an opposite direction to a contraction direction of the nut is applied, produced when the nut is cooled, are disposed between a screw groove of the screw shaft and a screw groove of the nut,
   the plurality of rolling elements are disposed between a screw groove of the screw shaft and a screw groove of the nut, and
   a two point preload in a tensile direction along a central axis of the nut is applied to the nut before the nut is cooled.

* * * * *